US012601872B2

(12) United States Patent
Dainese, Jr. et al.

(10) Patent No.: US 12,601,872 B2
(45) Date of Patent: Apr. 14, 2026

(54) HOLLOW-CORE OPTICAL FIBERS

(71) Applicant: CORNING INCORPORATED,
Corning, NY (US)

(72) Inventors: Paulo Clovis Dainese, Jr., Painted
Post, NY (US); Wei Jiang, Vestal, NY
(US); Ming-Jun Li, Horseheads, NY
(US); Xiaojun Liang, Chino Hills, CA
(US); Dan Trung Nguyen, Painted
Post, NY (US); **Ilia Andreyevich
Nikulin,** Wilmington, NC (US)

(73) Assignee: Corning Incorporated, Corning, NY
(US)

( * ) Notice: Subject to any disclaimer, the term of this
patent is extended or adjusted under 35
U.S.C. 154(b) by 364 days.

(21) Appl. No.: 18/226,319

(22) Filed: Jul. 26, 2023

(65) Prior Publication Data
US 2024/0036252 A1     Feb. 1, 2024

Related U.S. Application Data

(60) Provisional application No. 63/393,004, filed on Jul.
28, 2022.

(51) Int. Cl.
*G02B 6/032*     (2006.01)
*G02B 6/02*     (2006.01)

(52) U.S. Cl.
CPC .........  *G02B 6/032* (2013.01); *G02B 6/02328*
(2013.01)

(58) Field of Classification Search
CPC ................ G02B 6/02328; G02B 6/032; G02B
6/02357; G02B 6/02304; G02B 6/024;
G02B 6/02342; G02B 6/02366
See application file for complete search history.

(56) References Cited

U.S. PATENT DOCUMENTS

2020/0156987 A1 *  5/2020  Wheeler ............ G02B 6/02328
2020/0278491 A1    9/2020  Poletti et al.
(Continued)

FOREIGN PATENT DOCUMENTS

CN      110673256 B  *  2/2021  ......... G02B 6/02042
EP       4030205 A1     7/2022
(Continued)

OTHER PUBLICATIONS

Wei et al., Machine Translation of CN 110673256 B, Feb. 26, 2021.
(Year: 2021).*

(Continued)

*Primary Examiner* — Michelle R Connelly
(74) *Attorney, Agent, or Firm* — Kevin L. Bray

(57)     ABSTRACT

A hollow-core optical fiber may include a hollow core
extending along a central longitudinal axis of the fiber; a
substrate, the substrate having a tubular shape and an inner
surface surrounding the central longitudinal axis of the fiber;
and a plurality of cladding elements positioned between the
hollow core and the substrate, each of the cladding elements
extending in a direction parallel to the central longitudinal
axis of the fiber. Each of the cladding elements includes a
primary capillary, the primary capillary directly contacting
the inner surface of the substrate and having an inner surface
defining a cavity, and a plurality of nested capillaries posi-
tioned within the cavity, each of the nested capillaries
directly contacting the inner surface of the primary capillary.

19 Claims, 14 Drawing Sheets

(56)                    References Cited

U.S. PATENT DOCUMENTS

2021/0311250 A1*  10/2021  Jasion ............... C03B 37/02781
2022/0244452 A1*   8/2022  Benabid ................. G02B 6/024
2023/0040327 A1    2/2023  Fiacco et al.

FOREIGN PATENT DOCUMENTS

| | | | |
|---|---|---|---|
| GB | 2576190 | A | 2/2020 |
| IN | 202247001691 | | 2/2022 |
| WO | 2021/009213 | A1 | 1/2021 |
| WO | 2021/009222 | A1 | 1/2021 |
| WO | 2021/009227 | A1 | 1/2021 |
| WO | 2021/009231 | A1 | 1/2021 |
| WO | 2021/009236 | A1 | 1/2021 |
| WO | 2022/157010 | A1 | 7/2022 |

OTHER PUBLICATIONS

International Search Report and Written Opinion of the International Searching Authority; PCT/US2023/028319; dated Oct. 31, 2023; 12 pages; European Patent Office.
Selim Habib et al: "Low-loss hollow-core silica fibers with adjacent nested anti-resonant tubes", Optics Express, vol. 23, No. 13, 2015, p. 17394.
Sultana Jakeya et al: "Exploring Low Loss and Single Mode in Antiresonant Tube Lattice Terahertz Fibers", IEEE Access, IEEE, USA, vol. 8, Jun. 16, 2020 (Jun. 16, 2020), pp. 113309-113317.
Xiaosheng Huang, "Hollow core antiresonant fibres for fibre laser applications", Doctoral Thesis, Nanyang Technological University 2017, 164 pages.

* cited by examiner

HOLLOW-CORE OPTICAL FIBERS

This application claims the benefit of priority under 35 U.S.C § 120 of U.S. Provisional Application Ser. No. 63/393,004 filed on Jul. 28, 2022, the content of which is relied upon and incorporated herein by reference in its entirety.

BACKGROUND

Field

The present specification generally relates to optical fibers and, more specifically, to hollow-core optical fibers.

Technical Background

Hollow-core optical fibers transmit light through a hollow core. Loss of light from the hollow core along the length of the optical fiber may be an impediment to implementing hollow-core optical fibers in practical applications. Accordingly, a need exists for hollow-core optical fibers having structures that confine light to the hollow core, thereby reducing light loss from the hollow core along the length of the optical fiber.

SUMMARY

According to a first aspect of the present disclosure, a hollow-core optical fiber comprises a hollow core extending along a central longitudinal axis of the hollow-core optical fiber; a substrate, the substrate comprising a tubular shape and an inner surface surrounding the central longitudinal axis of the hollow-core optical fiber; and a plurality of cladding elements positioned between the hollow core and the substrate, each of the cladding elements extending in a direction parallel to the central longitudinal axis of the hollow-core optical fiber. Each of the cladding elements comprises a primary capillary, the primary capillary directly contacting the inner surface of the substrate and comprising an inner surface defining a cavity, and a plurality of nested capillaries positioned within the cavity, each of the nested capillaries directly contacting the inner surface of the primary capillary.

A second aspect of the present disclosure may include the first aspect, wherein the plurality of cladding elements comprises from 3 to 8 primary capillaries.

A third aspect of the present disclosure may include either the first aspect or second aspect, wherein the plurality of cladding elements comprises from 5 to 6 primary capillaries.

A fourth aspect of the present disclosure may include any of the first through third aspects, wherein each of the primary capillaries comprises silica-based glass.

A fifth aspect of the present disclosure may include any of the first through fourth aspects, wherein each of the nested capillaries comprises silica-based glass.

A sixth aspect of the present disclosure may include any of the first through fifth aspects, wherein the substrate comprises silica-based glass.

A seventh aspect of the present disclosure may include any of the first through sixth aspects, wherein the hollow core comprises one or more gasses.

An eighth aspect of the present disclosure may include any of the first through seventh aspects, wherein the hollow core consists essentially of air.

A ninth aspect of the present disclosure may include any of the first through eighth aspects, wherein each nested capillary is spaced apart from others of the plurality of nested capillaries.

A tenth aspect of the present disclosure may include any of the first through ninth aspects, wherein each nested capillary directly contacts at least one other nested capillary.

An eleventh aspect of the present disclosure may include any of the first through tenth aspects, wherein each nested capillary directly contacts at least two other nested capillaries.

A twelfth aspect of the present disclosure may include any of the first through eleventh aspects, wherein from 2 to 5 nested capillaries are positioned within the cavity of each primary capillary.

A thirteenth aspect of the present disclosure may include any of the first through twelfth aspects, wherein three nested capillaries are positioned within the cavity of each primary capillary.

A fourteenth aspect of the present disclosure may include the thirteenth aspect, wherein each nested capillary is arranged such that each nested capillary directly contacts the inner surface of the primary capillary on a vertex of an isosceles triangle, wherein each vertex of the isosceles triangle is on the inner surface of the primary capillary in a cross section of the primary capillary perpendicular to the central longitudinal axis of the hollow-core optical fiber.

A fifteenth aspect of the present disclosure may include either the thirteenth aspect or the fourteenth aspect, wherein each nested capillary is arranged such that each nested capillary directly contacts the inner surface of the primary capillary on a vertex of an equilateral triangle wherein each vertex of the equilateral triangle is on the inner surface of the primary capillary on a cross section of the primary capillary perpendicular to the central longitudinal axis of the hollow-core optical fiber.

A sixteenth aspect of the present disclosure may include any of the thirteenth to fifteenth aspects, wherein one nested capillary in each primary capillary is directly connected to the inner surface of the primary capillary proximate to the substrate.

A seventeenth aspect of the present disclosure may include any of the first to sixteenth aspects, wherein each primary capillary is spaced apart from adjacent primary capillaries in a circumferential direction.

An eighteenth aspect of the present disclosure may include any of the first to seventeenth aspects, wherein each primary capillary is spaced apart from adjacent primary capillaries by a distance of less than or equal to 6 μm.

A nineteenth aspect of the present disclosure may include any of the first to eighteenth aspects, wherein each primary capillary comprises a primary capillary central longitudinal axis parallel to the central longitudinal axis of the fiber.

A twentieth aspect of the present disclosure may include any of the first to nineteenth aspects, wherein each primary capillary has an inner diameter from 12 μtm to 50 μtm.

A twenty-first aspect of the present disclosure may include any of the first to twentieth aspects, wherein each primary capillary has a wall thickness from 0.1 μtm to 4 μm.

A twenty-second aspect of the present disclosure may include any of the first to twenty-first aspects, wherein each nested capillary has a diameter from 2 μm to 16 μtm.

A twenty-third aspect of the present disclosure may include any of the first to twenty-second aspects, wherein each nested capillary has a wall thickness 0.1 μtm to 4 μm.

A twenty-fourth aspect of the present disclosure may include any of the first to twenty-third aspects, wherein at least one of the plurality of cladding elements comprises one or more support capillaries wherein each support capillary directly contacts the inner surface of the substrate and directly contacts at least one primary capillary.

A twenty-fifth aspect of the present disclosure may include the twenty-fourth aspect, wherein each of the one or more support capillaries directly contacts the inner surface of the substrate and directly contacts two primary capillaries.

A twenty-sixth aspect of the present disclosure may include either the twenty-fourth aspect or the twenty-fifth aspect, wherein each of the one or more support capillaries comprises a support capillary central longitudinal axis parallel to the central longitudinal axis of the hollow-core optical fiber, and the support capillary central longitudinal axis of each support capillary is a first radial distance from the central longitudinal axis of the hollow-core optical fiber.

A twenty-seventh aspect of the present disclosure may include the twenty-sixth aspect, wherein each primary capillary comprises a primary capillary central longitudinal axis parallel to the central longitudinal axis of the hollow-core optical fiber; the primary capillary central longitudinal axis of each primary capillary is spaced apart from the central longitudinal axis of the hollow-core optical fiber by a second radial distance; and the first radial distance is greater than the second radial distance.

A twenty-eighth aspect of the present disclosure may include any of the first to twenty-seventh aspects, wherein the plurality of cladding elements are configured to provide an anti-resonant effect at a wavelength from 350 nm to 8000 nm, the anti-resonant effect operable to confine an optical signal propagating in the hollow-core optical fiber at the wavelength from 350 nm to 8000 nm to the hollow core.

A twenty-ninth aspect of the present disclosure may include any of the first to twenty-eighth aspects, wherein the hollow-core optical fiber has a total loss of a fundamental mode of an optical signal propagating in the hollow core of less than or equal to 0.8 dB/km at a wavelength of from 350 nm to 8000 nm.

A thirtieth aspect of the present disclosure may include any of the first to twenty-ninth aspects, wherein the hollow-core optical fiber has a minimum confinement loss of a fundamental mode of an optical signal propagating in the hollow core of less than or equal to 0.4 dB/km at a wavelength of from 350 nm to 8000 nm.

A thirty-first aspect of the present disclosure may include any of the first to thirtieth aspects, wherein the hollow-core optical fiber has a bending loss of a fundamental mode of an optical signal propagating in the hollow core of less than or equal to 0.1 dB/km at a wavelength of from 350 nm to 8000 nm for a bend radius of 6 cm.

Additional features and advantages will be set forth in the detailed description, which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
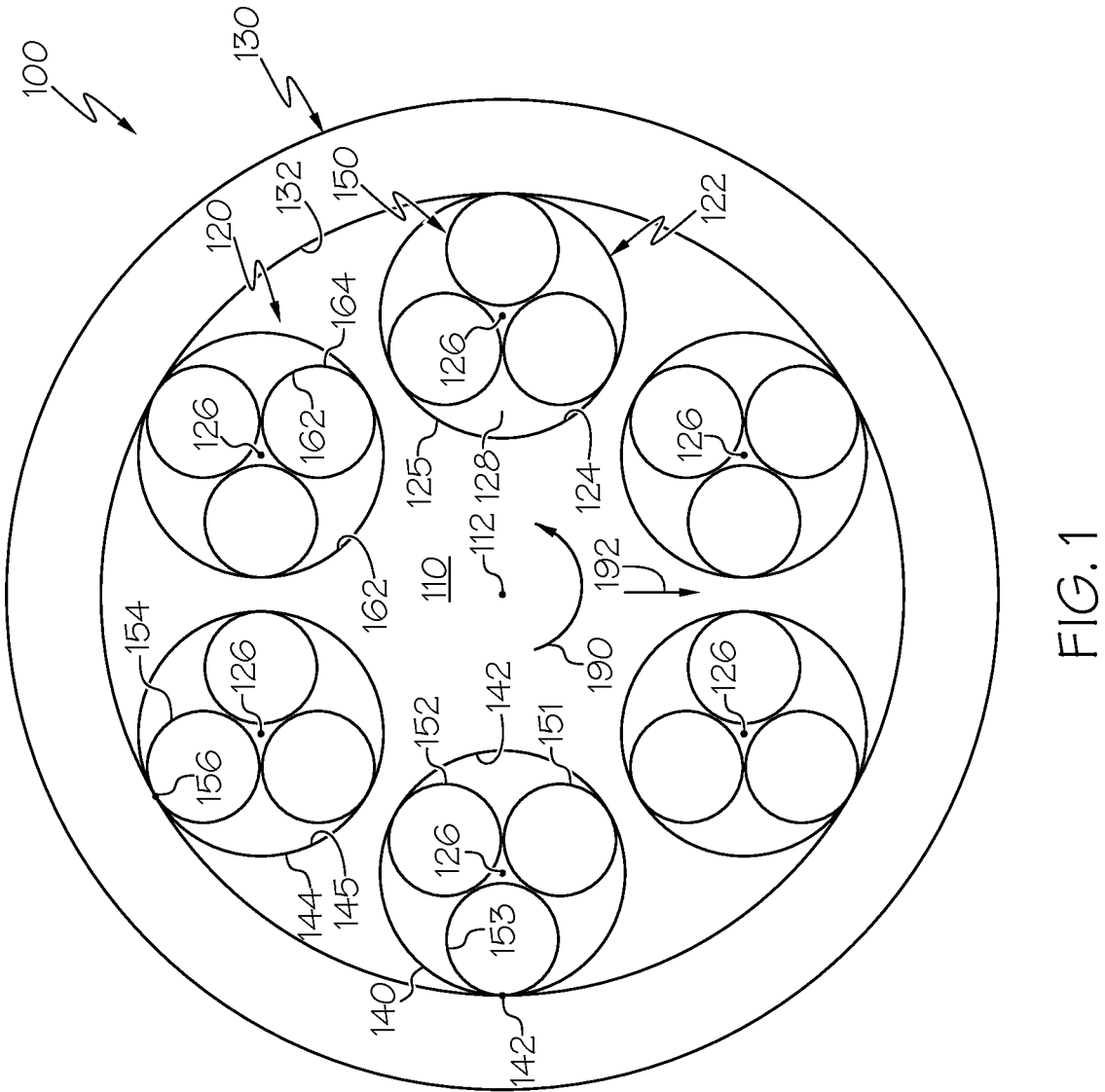
FIG. 1 schematically depicts a cross-sectional view of a hollow-core optical fiber according to one or more embodiments described herein.

Reference will now be made in detail to various embodiments of hollow-core optical fibers. Whenever possible, the same reference numerals will be used throughout the drawings to refer to the same or like parts. In embodiments, hollow-core optical fibers may comprise a hollow core, a substrate, and a plurality of cladding elements positioned between the hollow-core and the substrate. Each of the cladding elements may comprise a primary capillary and a plurality of nested capillaries positioned within each primary capillary. Embodiments of hollow-core optical fibers will be described in further detail herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein - for example up, down, right, left, front, back, top, bottom—are made only with reference to the figures as drawn and are not intended to imply absolute orientation.

Various components described herein may be referred to as "directly connected" or "indirectly connected". Components are directly connected when they are joined to one another with no intervening structure. Components may be joined by fusing, welding, adhesives, or any other suitable attachment means. Components are "indirectly connected" when they are joined to one another with intervening structure. Examples of intervening structure include welding aids (e.g. frits, solders, fluxes), adhesives, and bonding materials. In embodiments, components connected indirectly are connected only by a welding aid, adhesive, or bonding material. The term "connected" means "directly connected" or "indirectly connected". Components "directly connected" to one another are said to be in direct contact with each other. Components "indirectly connected" to one another are said to be in indirect contact with each other. Components "connected" to one another are in direct or indirect contact with each other.

As used herein, the singular forms "a," "an" and "the" include plural referents unless the context clearly dictates otherwise. Thus, for example, reference to "a" component includes aspects having two or more such components, unless the context clearly indicates otherwise.

Without intending to be bound by theory, an optical signal (i.e., light) may be passed through the hollow core of a hollow-core optical fiber. As used herein, "attenuation" refers to the reduction of intensity of the optical signal passing through the hollow-core optical fiber. Attenuation of the optical signal being guided through the hollow-core optical fiber may be reduced by various effects, including but not limited to, an anti-resonant effect and an inhibited coupling mechanism. Each of these effects may reduce the leakage of light from the hollow core of the optical fiber to the cladding elements of the optical fiber, which in turn reduces the attenuation of the optical signal propagating in the hollow core. Said differently, each of these effects may improve the confinement of light to the hollow core of the optical fiber, thereby reducing the attenuation of the optical signal propagating in the hollow core. Embodiments of hollow-core optical fibers described herein may comprise structures that utilize one or more of these effects to reduce the attenuation of an optical signal passing through the hollow-core optical fiber.

As used herein, "anti-resonance" or an "anti-resonant effect" refers to an effect that occurs when the thickness of a material (e.g. the material used to form cladding elements) is proportional to a wavelength of light passing through the hollow-core optical fiber such that the light passing through the hollow-core optical fiber is confined to the hollow core. Without intending to be bound by theory, an anti-resonant effect occurs when the thickness of a material satisfies the quarter-wave condition (phase accumulated on a single pass is one quarter of $2\pi$, and any odd multiple of a quarter wave). When this condition is applied to the thickness of the material, light is confined to the hollow core with minimum leakage to the cladding. In other words, this condition helps inhibit coupling between core modes and cladding modes, resulting in low loss of transmission and increased confinement of the optical signal in the hollow core. The antiresonant effect may, in one embodiment, be satisfied by a material having a thickness given by Equation 1:

$$t_{AR} = \frac{(2m-1)\lambda}{(4\{n^2-1\}^{1/2})} \qquad \text{Equation 1}$$

In Equation 1, $t_{AR}$ is the thickness of the material that satisfies the anti-resonance condition, $\lambda$ is the wavelength of the optical signal, m is an integer that is greater than or equal to 1, and n is the refractive index of the material. It should be noted that Equation 1 represents an ideal thickness of a material that would satisfy the anti-resonant effect, and that material thicknesses that are not exactly equal to $t_{AR}$ may also provide increased confinement of light to the hollow core. For example, without limitation, it is contemplated that a material having a thickness within 10% of $t_{AR}$ (from 90% $t_{AR}$ to 110% $t_{AR}$) may be operable to confine light to the hollow core.

As used herein, an "inhibited coupling mechanism" refers to an effect that occurs when cladding elements having negative curvature inhibit coupling between core modes and cladding modes to reduce light leakage from the hollow core. As used herein, "negative curvature" refers to cladding elements having a surface with a convex shape facing the central longitudinal axis of the hollow-core optical fiber. Without intending to be bound by theory, using cladding elements having a surface with a convex shape facing the central longitudinal axis of the hollow-core optical fiber may reduce the amount of light that contacts the cladding elements and may also reduce the light leaking through the cladding elements and the gaps between these cladding elements. In turn, this may reduce attenuation of the optical signal due to the leaking through the cladding elements and the gaps between them and may also reduce light scattering that may occur when light contacts the surface of the cladding elements.

Referring now to FIG. 1, a cross-section of one embodiment of a hollow-core optical fiber 100 is schematically depicted. In this embodiment, the hollow-core optical fiber 100 may comprise a hollow core 110 extending along a central longitudinal axis 112 of the fiber, a substrate 130, and a plurality of cladding elements 120 positioned between the hollow core 110 and the substrate 130. Generally, the hollow core 110 is the light-guiding portion of the hollow-core optical fiber 100. The plurality of cladding elements 120 may be operable to prevent the leakage of light out of the hollow core 110, generally, by causing destructive interference of light passing through the cladding elements, resulting in light propagating in the hollow core 110. Hollow core 110 has a radius that extends in an orthogonal direction from central longitudinal axis 112 to the closest point of contact with one of the cladding elements 120. The diameter of hollow core 110 is twice the radius of hollow core 110. The diameter of hollow core 110 is greater than or equal to 10 microns, or greater than or equal to 20 microns, or greater than or equal to 30 microns, or greater than or equal to 40 microns, or less than or equal to 65 microns, or less than or equal to 60 microns, or less than or equal to 55 microns, or less than or equal to 50 microns, or less than or equal to 45 microns, or less than or equal to 40 microns, or in a range from 10 microns to 60 microns, or in a range from 15 microns to 55 microns, or in a range from 20 microns to 50 microns or in a range from 15 microns to 45 microns, or in a range from 20 microns to 40 microns, or in a range from 25 microns to 35 microns.

The substrate 130 may provide support for the plurality of cladding elements 120. In embodiments, the substrate 130 may comprise a tubular shape comprising an inner surface 132 surrounding the central longitudinal axis 112 of the fiber. In embodiments, the outer diameter of the substrate 130 may be from 100 µm to 500 µm. For example, without limitation, the outer diameter of the substrate 130 may be from 100 µm to 500 µm, from 200 µm to 500 µm, from 300 um to 500 µm, from 400 µm to 500 µm, from 100 µm to 400 µm, from 100 µm to 300 µm, from 100 µm to 200 µm, or any combination or subset of these ranges. In embodiments, the outer diameter of the substrate may be from 100 µm to 250 µm. In embodiments, the wall thickness of the substrate 130 may be from 10 µm to 400 µm. For example, without limitation, the outer diameter of the substrate 130 may be from 25 µm to 350 µm, from 50 µm to 300 µm, from 200 um to 400 µm, from 300 µm to 400 µm, from 100 µm to 400 µm, from 100 µm to 300 µm, from 100 µm to 200 µm, or any combination or subset of these ranges. In embodiments, the outer diameter of the substrate may be from 100 µm to 250 µm.

In embodiments, one or more protective coatings (not depicted) may be positioned on an exterior surface of the substrate 130. These coatings may be, for example, organic materials, such as plastics or polymers, and may protect the hollow-core optical fiber 100 from the physical environment. The coatings may include a primary coating with a low Young's modulus (e.g. <1 MPa) surrounding and adjacent to the substrate 130 and a secondary coating with a high Young's modulus (e.g. >1000 MPa) surrounding and adjacent to the primary coating. Representative materials for primary and secondary coatings include acrylate materials (e.g. urethane acrylates). In embodiments, a coated fiber may have an outer diameter of 242 microns, 200 microns, or 190 microns. In embodiments the thickness of the primary coating in a radial direction is greater than microns, or greater than 15 microns, or greater than 20 microns, or less than 45 microns, or less than 40 microns, or less than 35 microns, or in a range from 10 microns to 45 microns, or in a range from 15 microns to 40 microns, or in a range from 20 microns to 35 microns. In embodiments the thickness of the secondary coating in a radial direction is greater than 10 microns, or greater than 15 microns, or greater than 20 microns, or less than 45 microns, or less than 40 microns, or less than 35 microns, or in a range from 10 microns to 45 microns, or in a range from microns to 40 microns, or in a range from 20 microns to 35 microns.

In embodiments, each of the plurality of cladding elements 120 may extend in a direction parallel to the central longitudinal axis 112 of the fiber and comprises a primary capillary 122. Each primary capillary 122 directly contacts the inner surface 132 of the substrate 130, such as when each primary capillary is set against, fused to, or otherwise joined to the inner surface 132 of the substrate 130. Each primary capillary 122 comprises an inner surface 124 defining a cavity 128. In addition, each of the plurality of cladding elements 120 also comprises a plurality of nested capillaries 150. The plurality of nested capillaries 150 are positioned within the cavity 128 of each primary capillary 122.

In embodiments, the plurality of cladding elements 120 may each comprise from 3 to 8 primary capillaries 122. For example, and without limitation, the plurality of cladding elements 120 may comprise 3, 4, 5, 6, 7, or even 8 primary capillaries 122. In embodiments, each of the plurality of cladding elements 120 may comprise 5 or 6 primary capillaries 122. As described herein, the primary capillaries may have an enclosed cross section comprising a wall having an inner surface 124 and an exterior surface 125. The inner surface 124 may define a cavity 128 that is occupied by the plurality of nested capillaries 150 and a gas. Accordingly, it should be understood that the primary capillaries 122 generally may have a tubular shape. In embodiments, the primary capillaries 122 may have a circular, elliptical, oval, or any other suitable cross sectional shape. When the primary capillaries 122 have a circular, elliptical, oval, or similar cross sectional shape, a convex surface of the capillary may be facing the hollow core of the hollow-core optical fiber. Without intending to be bound by theory, a convex surface provides a negative curvature effect that facilitates an inhibited coupling mechanism to reduce attenuation of an optical signal passing through the hollow-core optical fiber.

In embodiments, each primary capillary 122 in the plurality of cladding elements 120 may be directly connected to the inner surface 132 of the substrate 130. For example, primary capillary 140 is directly connected to the inner surface 132 of the substrate 130 at point 142 in the embodiment depicted in FIG. 1.

Still referring to FIG. 1, each primary capillary 122 in the plurality of cladding elements 120 comprises a primary capillary central longitudinal axis 126. In embodiments, each primary capillary central longitudinal axis 126 may be parallel to the central longitudinal axis 112 of the fiber of the hollow-core optical fiber 100. In embodiments, each primary capillary central longitudinal axis 126 may be parallel to each of the other primary capillary central longitudinal axes 126. In embodiments, each primary capillary central longitudinal axis 126 may be positioned on a circumference of a circle that is perpendicular to the central longitudinal axis 112 of the fiber. For example, in embodiments, each primary capillary central longitudinal axis 126 may be positioned on the circumference of a circle that is perpendicular to and centered on the central longitudinal axis 112 of the fiber. In such embodiments, it should be understood that each primary capillary central longitudinal axis 126 is equidistant from the central longitudinal axis 112 of the fiber.

In embodiments, each primary capillary 122 in the plurality of cladding elements 120 is spaced apart from adjacent primary capillaries 122 in the plurality of cladding elements 120 in a circumferential direction 190. That is, each primary capillary 122 in the plurality of cladding elements 120 may not be in direct contact with another primary capillary 122 in the plurality of cladding elements 120. For example, according to the embodiment depicted in FIG. 1, primary capillary 140 and primary capillary 144 are both primary capillaries 122, and primary capillary 140 and primary capillary 144 are spaced apart in a circumferential direction 190 such that primary capillary 140 and primary capillary 144 are not in direct contact with each other. Without intending to be bound by theory, when primary capillaries 122 are in direct contact, the points at which the primary capillaries 122 connect may support localized modes, which may form a link between core modes and cladding modes that may increase light leakage from the hollow core 110. Accordingly, direct contact between primary capillaries 122 may reduce the confinement of light in the hollow core 110 of the hollow-core optical fiber 100 at those points. In turn, this may result in increased attenuation of an optical signal passing through the hollow-core optical fiber 100.

Each primary capillary 122 may be spaced apart from adjacent primary capillaries 122 by a distance of greater than 0 microns and less than or equal to 6 µm without contacting the adjacent primary capillaries. As described herein, the distance by which two adjacent capillaries are spaced apart is the shortest distance between the exterior surfaces of the adjacent capillaries. For example, without limitation, each primary capillary 122 may be spaced apart from adjacent primary capillaries by a distance of greater than 0 microns and less than or equal to 6 µm, 5 µm, 4 um, 3 µm, 2 µm, or 1 µm, without contacting. Without intending to be bound by theory, reducing the distance between the primary capillaries 122 may reduce attenuation of an optical signal passing through the hollow-core optical fiber 100. If the distance between the primary capillaries 122 is too large (e.g., greater than 6 µm) light may leak out of the hollow core through the gaps between the primary capillaries 122, increasing the attenuation of the optical signal. Positioning the primary capillaries 122 such that the distance between the primary capillaries 122 is less than or equal to 6 µm, without contacting, may minimize such losses.

In embodiments, each primary capillary 122 in the plurality of cladding elements 120 may have an inner diameter from 12 µm to 50 µm. For example, without limitation, each primary capillary 122 may have an inner diameter from 12 µm to 50 µm, from 16 µm to 50 µm, from 20 µm to 50 µm, from 24 µm to 50 µm, from 28 µm to 50 µm, from 32 µm to 50 µm, from 36 µm to 50 µm, from 40 µm to 50 µm, from 44 µm to 50 µm, from 48 µm to 50 µm, from 12 µm to 46 µm, 12 µm to 42 µm, from 12 µm to 38 µm, from 12 µm to 34 µm, from 12 µm to 30 µm, from 12 µm to 26 µm, from 12 µm to 22 µm, from 12 µm to 18 µm, from 12 µm to 16 µm, or any combination or sub-set of these ranges. In embodiments, each primary capillary 122 in the plurality of cladding elements 120 may have the same inner diameter.

In embodiments, each primary capillary 122 in the plurality of cladding elements 120 may have a wall thickness from 0.1 µtm to 4 µm. As described herein, wall thickness refers to the distance between the exterior surface 125 of the primary capillary 122 and the inner surface 124 of the primary capillary 122. For example, without limitation, each primary capillary 122 may have a wall thickness from 0.1 µm to 4.0 µm, from 0.5 µm to 4.0 µm, from 1 µm to 4.0 µm, from 1.5 µm to 4.0 µm, from 2.0 µm to 4.0 µm, from 2.5 µm to 4.0 µm, from 3.0 µm to 4.0 µm, from 3.5 µm to 4.0 µm, 0.1 µm to 3.5 µm, 0.1 µm to 3.0 µm, 0.1 µm to 2.5 µm, 0.1 µm to 2.0 µm, 0.1 µm to 1.5 µm, 0.1 µm to 1.0 µm, 0.1 µm to 0.5 µm, or any combination or sub-set of these ranges. In embodiments, each primary capillary 122 may have the same thickness. In embodiments, each primary capillary 122 may have a wall thickness, such as a wall thickness according to Equation 1, that promotes confinement of the optical signal in hollow core 110 through an anti-resonant effect. Without intending to be bound by theory, when each primary capillary 122 has a wall thickness that provides an anti-resonant effect, attenuation of an optical signal passing through the hollow-core optical fiber 100 may be reduced.

Still referring to FIG. 1, each of the plurality of cladding elements 120 may comprise a plurality of nested capillaries 150 positioned within the cavity 128 of each primary capillary 122. As described herein, a "nested capillary" refers to a capillary positioned within another capillary such that an exterior surface 164 of the nested capillary 150 is directly connected to an inner surface 124 of the primary capillary 122. In embodiments, each nested capillary 150 is directly connected to an inner surface 124 of the primary capillary 122 in which it is positioned. For example, according to the embodiment depicted in FIG. 1, nested capillary 152 is directly connected to an inner surface 142 of primary capillary 140.

In embodiments, from 2 to 5 nested capillaries 150 are positioned within the cavity 128 of each primary capillary 122. For example, without limitation, 2, 3, 4, or even 5 nested capillaries 150 may be positioned within the cavity 128 of each primary capillary 122. In embodiments, 3 nested capillaries 150 may be positioned within the cavity 128 of each primary capillary 122. In some embodiments, the same number of nested capillaries 150 may be positioned in the cavity 128 of each primary capillary 122.

Figure 2:
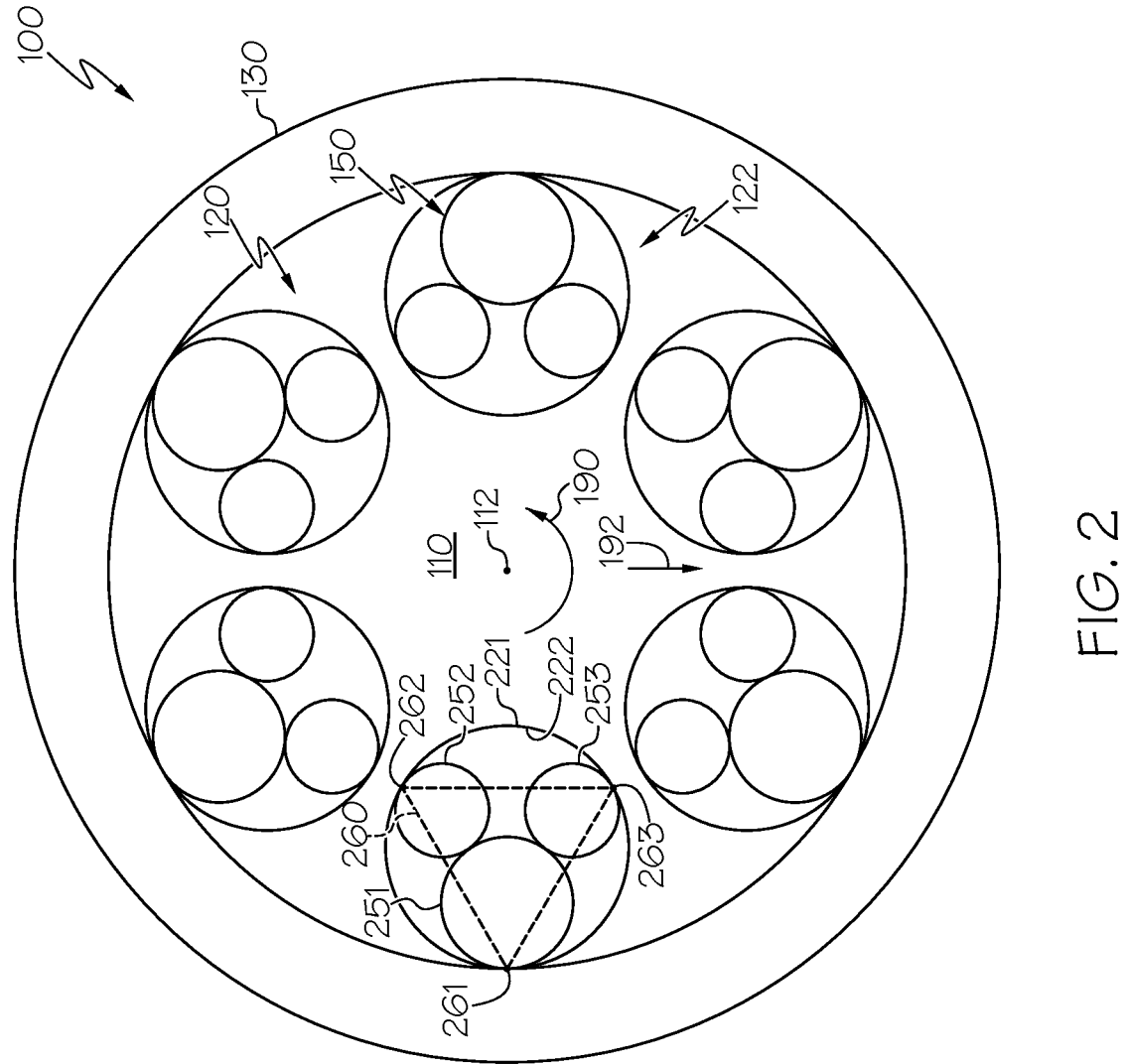
FIG. 2 schematically depicts a cross-sectional view of a hollow-core optical fiber according to one or more embodiments described herein.

Each nested capillary 150 may have an inner diameter from 2 µm to 16 µm. For example, without limitation, each nested capillary 150 may have an inner diameter from 2 µm to 16 µm, from 4 µm to 16 µm, from 6 µm to 16 µm, from 8 µm to 16 µm, from 10 µm to 16 µm, from 12 µm to 16 µm, from 14 µm to 16 µm, from 2 µm to 14 µm, from 2 µm to 12 µm, from 2 µm to 10 µm, from 2 µm to 8 µm, from 2 µm to 6 µm, from 2 µm to 4 µm, or any combination or sub-set of these ranges. In embodiments, each nested capillary 150 positioned within a primary capillary 122 may have a different inner diameter. In embodiments, two or more nested capillaries 150 positioned within a primary capillary 122 may have the same inner diameter. For example, according to the embodiment depicted in FIG. 2, nested capillary 252 and nested capillary 253 have a first inner diameter and nested capillary 251 has a second inner diameter different than the first inner diameter. In embodiments, each nested capillary 150 positioned within a primary capillary 122 may have the same inner diameter, as depicted FIGS. 1 and 3. For example, according to the embodiment depicted in FIG. 3, nested capillary 351, nested capillary 352, and nested capillary 353 each have the same inner diameter. In embodiments, each nested capillary 150 positioned within any primary capillary 122 may have the same inner diameter.

Referring again to FIG. 1, each nested capillary 150 has a wall thickness from 0.1 µm to 4.0 µm. Wall thickness refers to the distance between the exterior surface 164 of the nested capillary 150 and the inner surface 162 of the nested capillary 150. For example, without limitation, each nested capillary 150 has a wall thickness from 0.1 µm to 4.0 µm, from 0.5 µm to 4.0 µm, from 1 µm to 4.0 µm, from 1.5 µm to 4.0 µm, from 2.0 µm to 4.0 µm, from 2.5 µm to 4.0 µm, from 3.0 µm to 4.0 µm, from 3.5 µm to 4.0 µm, 0.1 µm to 3.5 µm, 0.1 µm to 3.0 µm, 0.1 µm to 2.5 µm, 0.1 µm to 2.0 µm, 0.1 µm to 1.5 µm, 0.1 µm to 1.0 µm, 0.1 µm to 0.5 µm, or any combination or sub-set of these ranges. In embodiments, each nested capillary 150 may have the same wall thickness. In embodiments, each nested capillary 150 may have a wall thickness, such as a wall thickness according to Equation 1, that promotes confinement of the optical signal in hollow core 110 through an anti-resonant effect. Without intending to be bound by theory, when each nested capillary 150 has a wall thickness that provides an anti-resonant effect, attenuation of an optical signal passing through the hollow-core optical fiber 100 may be reduced. Without intending to be bound by theory, the inclusion of nested capillaries 150 in each primary capillary 122 provides additional opportunities for the anti-resonant effect to confine light to the hollow core 110, which otherwise may not have been confined by the primary capillary 122. Likewise, the inclusion of nested capillaries in the cladding may provide another opportunity for an inhibited coupling mechanism to confine light to the hollow core.

In embodiments, each nested capillary 150 may be arranged such that each nested capillary 150 directly contacts the inner surface 124 of the primary capillary 122 at a vertex of an isosceles triangle, where each vertex of the isosceles triangle is on the inner surface 124 of the primary capillary 122 in a cross section of the primary capillary 122 that is perpendicular to the central longitudinal axis 112 of the fiber. For example, in the embodiment depicted in FIG. 2, nested capillary 251, nested capillary 252, and nested capillary 253 are each positioned in primary capillary 221.

Nested capillary 251 is directly connected to the inner surface 222 of primary capillary 221 at point 261. Nested capillary 252 is directly connected to the inner surface 222 of primary capillary 221 at point 262, and nested capillary 253 is directly connected to the inner surface 222 of primary capillary 221 at point 263. Point 261, point 262, and point 263 are vertices of isosceles triangle 260.

In some embodiments, the isosceles triangle may be an equilateral triangle. In such embodiments, each nested capillary 150 may be arranged such that each nested capillary 150 directly contacts an inner surface 124 of the primary capillary 122 on a vertex of an equilateral triangle, where each vertex of the equilateral triangle is on the inner surface 124 of the primary capillary 122 in a cross section of the primary capillary 122 that is perpendicular to the central longitudinal axis 112 of the fiber. For example, in the embodiment depicted in FIG. 3, nested capillary 351, nested capillary 352, and nested capillary 353 are each positioned in primary capillary 321. Nested capillary 351 is directly connected to the inner surface 322 of primary capillary 321 at point 361. Nested capillary 352 is directly connected to the inner surface 322 of primary capillary 321 at point 362, and nested capillary 353 is directly connected to the inner surface 322 of primary capillary 321 at point 363. Point 361, point 362, and point 363 are each vertices of equilateral triangle 360.

In embodiments, at least two nested capillaries 150 positioned within a primary capillary 122 may be directly connected. For example, in the embodiment depicted in FIG. 2, nested capillary 251 is directly connected to nested capillary 252 and nested capillary 253. In embodiments, each nested capillary 150 positioned within a primary capillary 122 may be directly connected to each of the other nested capillaries 150 positioned within the same primary capillary 122. For example, in the embodiment depicted in FIG. 1, nested capillary 151, nested capillary 152, and nested capillary 153 are each directly connected to each other. In embodiments, each nested capillary is directly connected to one other, two other, or more than two other nested capillaries. Without intending to be bound by theory, direct connection between nested capillaries may increase the structural integrity of the nested capillaries in the cladding elements 120. This may lead to fewer defects in the nested capillary structures during manufacturing of the hollow-core optical fiber 100.

Figure 3:
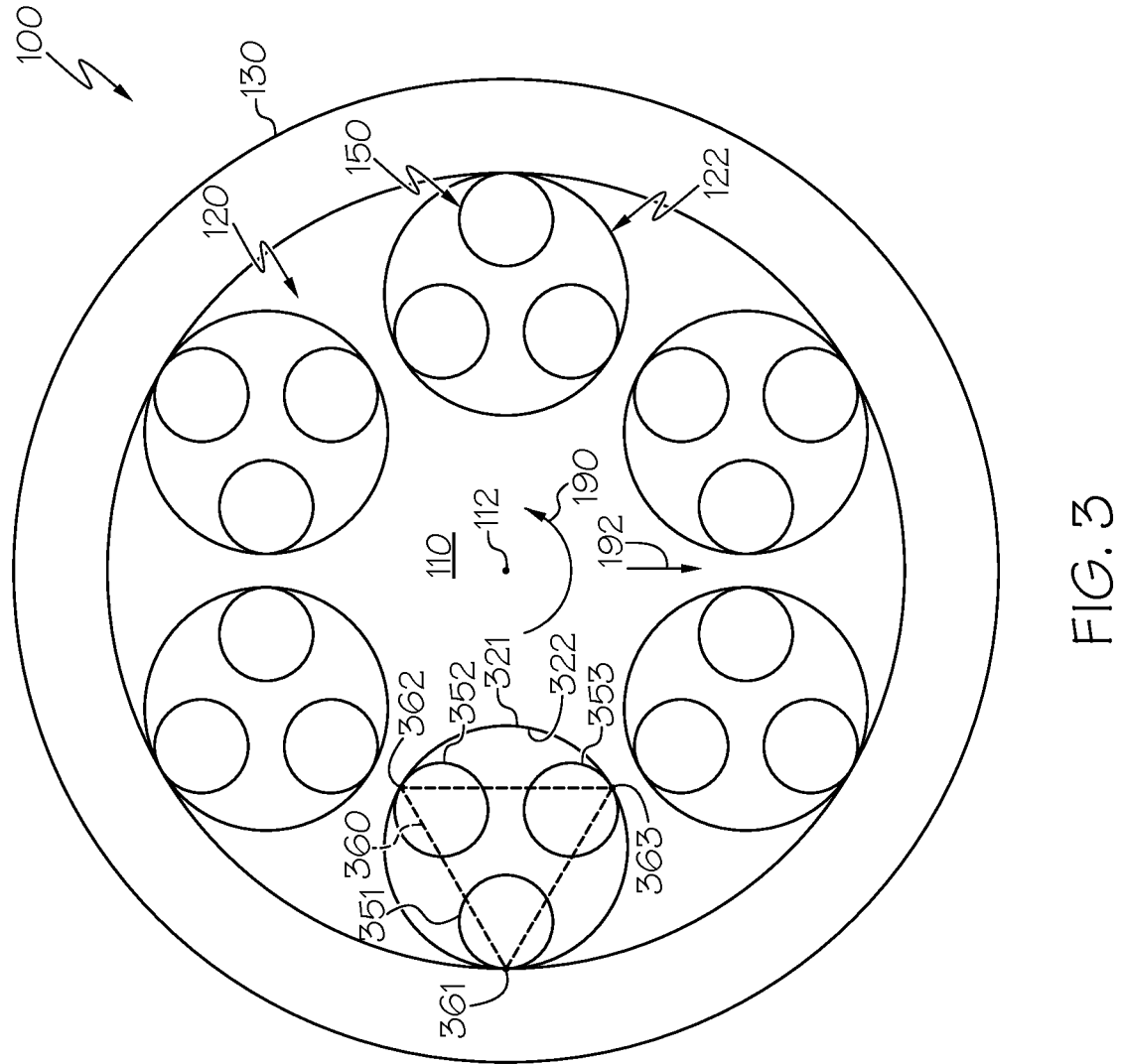
FIG. 3 schematically depicts a cross-sectional view of a hollow-core optical fiber according to one or more embodiments described herein.

Referring now to FIG. 3, the nested capillaries 150 positioned within a primary capillary 122 may be spaced apart from each other such that none of the nested capillaries 150 is directly connected to any other nested capillary 150. In such embodiments, each nested capillary 150 positioned in a primary capillary 122 is not directly connected to another nested capillary 150. For example, in the embodiment depicted in FIG. 3, nested capillary 351, nested capillary 352, and nested capillary 353 are spaced apart such that nested capillary 351, nested capillary 352, and nested capillary 353 are not directly connected to each other. Without intending to be bound by theory, when nested capillaries 150 are directly connected to each other, the points at which the nested capillaries connect may support localized modes, which may form a link between core modes and cladding modes that may increase light leakage from the hollow core. Accordingly, reducing points of direct contact between nested capillaries 150 may improve the ability of the fiber to confine light to the hollow core 110 of the hollow-core optical fiber 100. This may result in decreased attenuation of an optical signal passing through the hollow-core optical fiber 100. It should be noted that a number of contact points between nested capillaries 150 may be selected to provide both good mechanical stability and confinement of light to the hollow core of the fiber.

Referring again to FIG. 1, one nested capillary 150 in each primary capillary 122 may be directly connected to the inner surface 124 of the primary capillary 122 proximate to the substrate 130. As described herein, a point on the inner surface 124 of a primary capillary 122 is proximate to the substrate 130 when it is the closest point to the substrate 130 evaluated in a radial direction 192. For example, according to the embodiment depicted in FIG. 1, nested capillary 154 is directly connected to an inner surface 145 of capillary 144 at point 156, which is proximate to the substrate 130 because it is the closest point on inner surface 145 of capillary 144 to the substrate 130 when evaluated in a radial direction 192. In embodiments, one nested capillary 150 in each primary capillary 122 may be directly connected to the inner surface 124 of the primary capillary 122 at a point that is within 30° of the point proximate to the substrate 130. For example, without limitation, at least one nested capillary 150 in each primary capillary 122 may be directly connected to the inner surface 124 of the primary capillary 122 at a point that is within 30°, 25°, 20°, 15°, 10°, 5° or even 1° of the point proximate to the substrate 130.

In the embodiments described herein, at least one of the primary capillaries 122 or at least one of the nested capillaries 150 may comprise silica-based glass. Silica based glass may include pure silica or silica that is doped with one or more dopants to modify the index of refraction of the silica. In embodiments, each of the primary capillaries 122 may comprise silica-based glass, each of the nested capillaries 150 may comprise silica-based glass, or each of the primary and nested capillaries may comprise silica-based glass. In embodiments, each of the primary capillaries 122, each of the nested capillaries 150, or both may consist essentially of or consist of silica-based glass. In embodiments, the substrate 130 may comprise silica-based glass. In embodiments, the substrate 130 may consist essentially of or consist of silica-based glass.

In embodiments, the hollow core 110 may comprise one or more gasses. In embodiments, the hollow core 110 may comprise one or more inert gasses. In embodiments, the hollow core 110 may comprise, consist essentially of, or consist of air.

Figure 4:
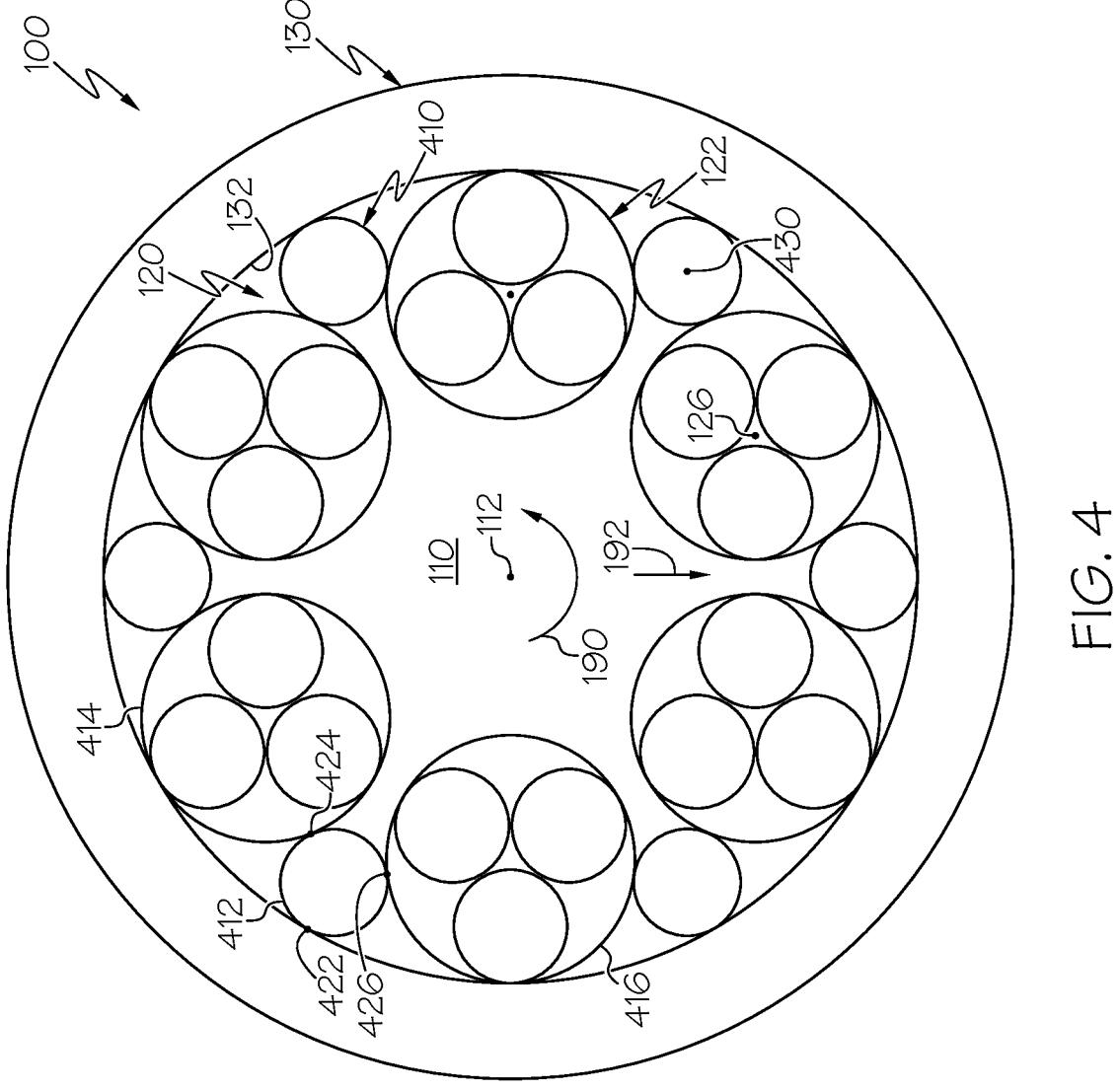
FIG. 4 schematically depicts a cross-sectional view of a hollow-core optical fiber according to one or more embodiments described herein.
Figure 5:
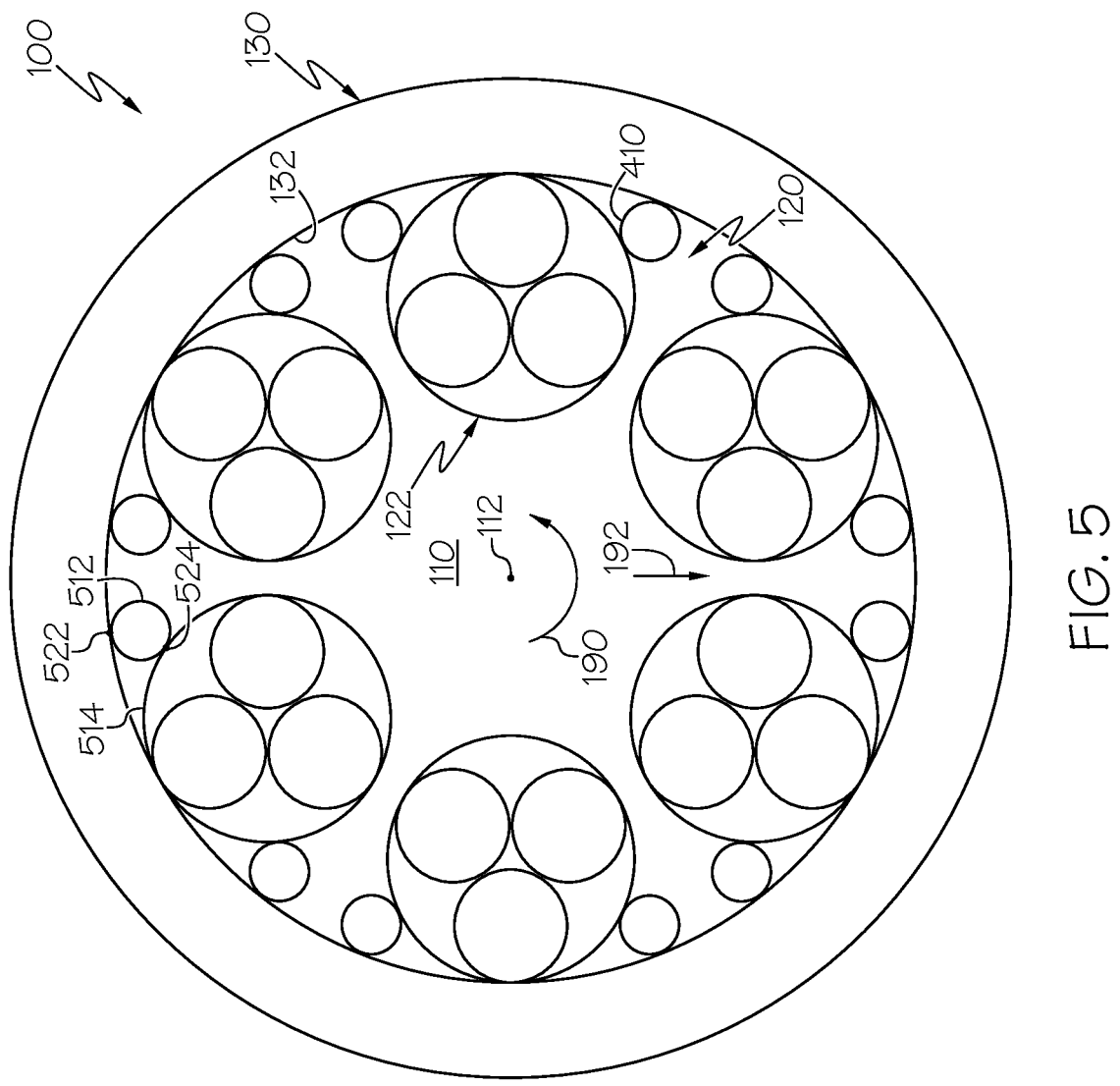
FIG. 5 schematically depicts a cross-sectional view of a hollow-core optical fiber according to one or more embodiments described herein.

Referring now to FIGS. 4 and 5, in embodiments, at least one of the plurality of cladding elements 120 comprises one or more support capillaries 410. Each support capillary 410 directly contacts the inner surface 132 of the substrate 130 and at least one primary capillary 122. In embodiments, each support capillary 410 may directly contact the inner surface 132 of the substrate 130 and two primary capillaries 122. For example, support capillary 412 directly contacts the inner surface 132 of the substrate 130 at point 422; support capillary 412 directly contacts primary capillary 414 at point 424; and support capillary 412 directly contacts primary capillary 416 at point 426 in the embodiment depicted in FIG. 4. In embodiments, each support capillary 410 directly contacts the inner surface 132 of the substrate 130 and one primary capillary 122. For example, support capillary 512 directly contacts the inner surface 132 of the substrate 130 at point 522, and support capillary 512 directly contacts primary capillary 514 at point 524 in the embodiment depicted in FIG. 5.

The support capillaries are operable to support the primary capillaries 122. In embodiments, the support capillaries may comprise silica-based glass. In embodiments, the support capillaries may be operable to confine light to the hollow core by negative curvature or anti-resonant effects. In embodiments, the support capillaries may allow for a gap of greater than 6 μm between the primary capillaries. However, light guiding characteristics of the support capillaries 410 are secondary to the structural support characteristics of the support capillaries 410. Without intending to be bound by theory, including the support capillaries 410 in the plurality of cladding elements 120 of the hollow-core optical fiber 100 may increase the structural integrity of the plurality of cladding elements 120 and result in fewer defects in the plurality of cladding elements 120 during manufacturing of the hollow-core optical fiber 100. In embodiments, support capillaries 410 are occupied solely by a gas and do not contain a nested capillary.

In embodiments, each support capillary 410 comprises a support capillary central longitudinal axis 430 parallel to the central longitudinal axis 112 of the fiber. Each support capillary central longitudinal axis 430 is a first radial distance from the central longitudinal axis 112 of the fiber. In embodiments, each support capillary central longitudinal axis 430 may be positioned on a circumference of a circle that is perpendicular to central longitudinal axis 112 of the fiber. For example, in embodiments, each support capillary central longitudinal axis 430 may be positioned on the circumference of a circle that is perpendicular to and centered on the central longitudinal axis 112 of the fiber. In such embodiments, it should be understood that each support capillary central longitudinal axis 430 is equidistant from the central longitudinal axis 112 of the fiber. In embodiments, each primary capillary central longitudinal axis 126 is parallel to the central longitudinal axis 112 of the fiber and is spaced apart from the central longitudinal axis 112 of the fiber by a second radial distance. In embodiments, the first radial distance is greater than the second radial distance.

In the embodiments described herein, the plurality of cladding elements 120 may be configured to confine a fundamental mode of an optical signal (i.e., light) propagating in the hollow core 110 of the hollow-core optical fiber 100 to the hollow core 110 by one or more of the anti-resonant effect and an inhibited coupling mechanism. In embodiments, confinement occurs without the effect of a periodic photonic bandgap structure. In embodiments, the fundamental mode of the optical signal guided by hollow core 110 may have a wavelength from 350 nm to 8000 nm. For example, without limitation, the fundamental mode of the optical signal guided by hollow core 110 may have a wavelength from 350 nm to 8000 nm, from 500 nm to 8000 nm, from 1000 nm to 8000 nm, from 1500 nm to 8000 nm, from 2000 nm to 8000 nm, from 2500 nm to 8000 nm, from 3000 nm to 8000 nm, from 3500 nm to 8000 nm, from 4000 nm to 8000 nm, from 4500 nm to 8000 nm, from 5000 nm to 8000 nm, from 5500 nm to 8000 nm, from 6000 nm to 8000 nm, from 6500 nm to 8000 nm, from 7000 nm to 8000 nm, from 7500 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these ranges. In embodiments, the plurality of cladding elements 120 may be configured to provide an anti-resonant effect at a wavelength from 350 nm to 8000 nm, the anti-resonant effect operable to confine an optical signal propagating in the hollow-core optical fiber at the wavelength from 350 nm to 8000 nm to the hollow core.

In embodiments, the hollow-core optical fiber 100 may have a total loss of a fundamental mode of an optical signal propagating in the hollow core 110 of less than or equal to 0.8 dB/km at a wavelength of from 350 nm to 8000 nm. As described herein, "total loss" refers to the attenuation of an optical signal due to any type of loss, including but not limited to confinement loss, scattering loss, and bending loss. Total loss may be determined by the cutback method that is commonly used for optical fibers. The cutback method involves comparing the optical power transmitted through a long piece of fiber to the power transmitted through a short piece of the fiber. In this method, light is launched into a test fiber of known length L and the output power P is measured first. Without disturbing the launch condition, the test fiber is cut back to a shorter length $L_0$, for example 2 m, and the output power Po of the short fiber is then measured. The fiber attenuation coefficient a is calculated using the Equation 2:

$$\alpha\left(\frac{dB}{km}\right) = \frac{10\log(P_0/P)}{L - L_0} \qquad \text{Equation 2}$$

Without intending to be bound by theory, confinement loss may be the dominant attenuation factor in the hollow-core optical fibers described herein. Confinement loss may occur as light leaks from the hollow core 110 to the cladding 130. Confinement loss may be calculated using Equation 3 and Equation 4.

$$n_{eff} = n_r + i \cdot n_{im} \qquad \text{Equation 3}$$

$$CL\left[\frac{dB}{km}\right] = \frac{20}{\ln(10)} \cdot \frac{2\pi}{\lambda} \cdot \text{Im}(n_{eff}) \cdot 10^3 \qquad \text{Equation 4}$$

In Equations 3 and 4, $n_{eff}$ is the effective index of the mode propagating in the hollow-core fiber with the real part of $n_r$ and the imaginary part of $n_{im}$. The real part of the effective index is related to the propagation speed of the mode and the imaginary part is related to the confinement loss of the mode. For an anti-resonant hollow core fiber with a given structure of the core and the cladding, the effective index may be determined using a fiber modeling tool, such COMSOL Multiphysics®. The confinement loss is calculated using Equation 4.

In embodiments, the hollow-core optical fiber 100 has a minimum confinement loss of a fundamental mode of an optical signal propagating in the hollow core 110 of less than or equal to 0.4 dB/km within a wavelength range from 350 nm to 8000 nm. For example, without limitation, the hollow-core optical fiber 100 may have a minimum confinement loss of less than or equal to 0.4 dB/km, 0.3 dB/km, 0.2 dB/km, 0.1 dB/km, or 0.05 dB/km within a wavelength range from 350 nm to 8000 nm, from 500 nm to 8000 nm, from 1000 nm to 8000 nm, from 1500 nm to 8000 nm, from 2000 nm to 8000 nm, from 2500 nm to 8000 nm, from 3000 nm to 8000 nm, from 3500 nm to 8000 nm, from 4000 nm to 8000 nm, from 4500 nm to 8000 nm, from 5000 nm to 8000 nm, from 5500 nm to 8000 nm, from 6000 nm to 8000 nm, from 6500 nm to 8000 nm, from 7000 nm to 8000 nm, from 7500 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these wavelength ranges.

As described herein, "bending loss" refers to a difference between the attenuation of a hollow-core optical fiber in a bent configuration and a straight configuration. Without intending to be bound by theory, bending loss is the additional propagation loss caused by coupling light from core modes to cladding modes when the fiber is bent. A bend in a fiber may be described in terms of a bend radius, which refers to the radius of a hypothetical circle having the same curvature as the bend. Bending loss may be determined by using a mandrel wrap test. In this test method, light is launched into a test fiber with a portion wrapped on a mandrel of known bend radius R with one or more turns N and the output power P is measured first. Without disturbing the launch condition, the wrapped fiber portion is released to a straight condition and the output power $P_0$ is then measured. The bending loss of the fiber $\alpha_B$ is calculated using the Equation 5:

$$\alpha_B\left(\frac{dB}{turn}\right) = \frac{10\log(P_0/P)}{N} \qquad \text{Equation 5}$$

In embodiments, the hollow-core optical fiber 100 has a minimum bending loss of a fundamental mode of an optical signal propagating through the hollow core of less than or equal to 0.1 dB/km within a wavelength range from 350 nm to 8000 nm for a bend radius of 6 cm. For example, without limitation, the hollow-core optical fiber 100 may have a minimum bending loss of less than or equal to 0.1 dB/km, 0.08 dB/km, 0.06 dB/km, 0.04 dB/km, 0.02 dB/km or 0.01 dB/km within a wavelength range from 350 nm to 8000 nm, from 500 nm to 8000 nm, from 1000 nm to 8000 nm, from 1500 nm to 8000 nm, from 2000 nm to 8000 nm, from 2500 nm to 8000 nm, from 3000 nm to 8000 nm, from 3500 nm to 8000 nm, from 4000 nm to 8000 nm, from 4500 nm to 8000 nm, from 5000 nm to 8000 nm, from 5500 nm to 8000 nm, from 6000 nm to 8000 nm, from 6500 nm to 8000 nm, from 7000 nm to 8000 nm, from 7500 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these wavelength ranges for a bend radius of 6 cm.

Embodiments of the hollow-core optical fibers described herein may be made by the following method. The cladding elements, such as the primary capillaries 122 and the nested capillaries 150, may be sleeved into a substrate 130 in a desired arrangement. The cladding elements may be joined to the substrate 130 and each other, as desired, to form a preform assembly. The cladding elements and substrate may be joined by any suitable means, such as, but not limited to, heating, contacting, fusing, welding, and adhesives. Techniques for welding include laser welding, flame welding, and plasma welding. The preform assembly may be redrawn into a fiber preform using conventional fiber redraw techniques. The fiber preform may then be drawn into optical fiber using conventional fiber drawing techniques.

EXAMPLES

The embodiments described herein will be further clarified by the following examples.

Example 1—Modeling Confinement Loss of a Hollow-Core Optical Fiber

Figure 6:
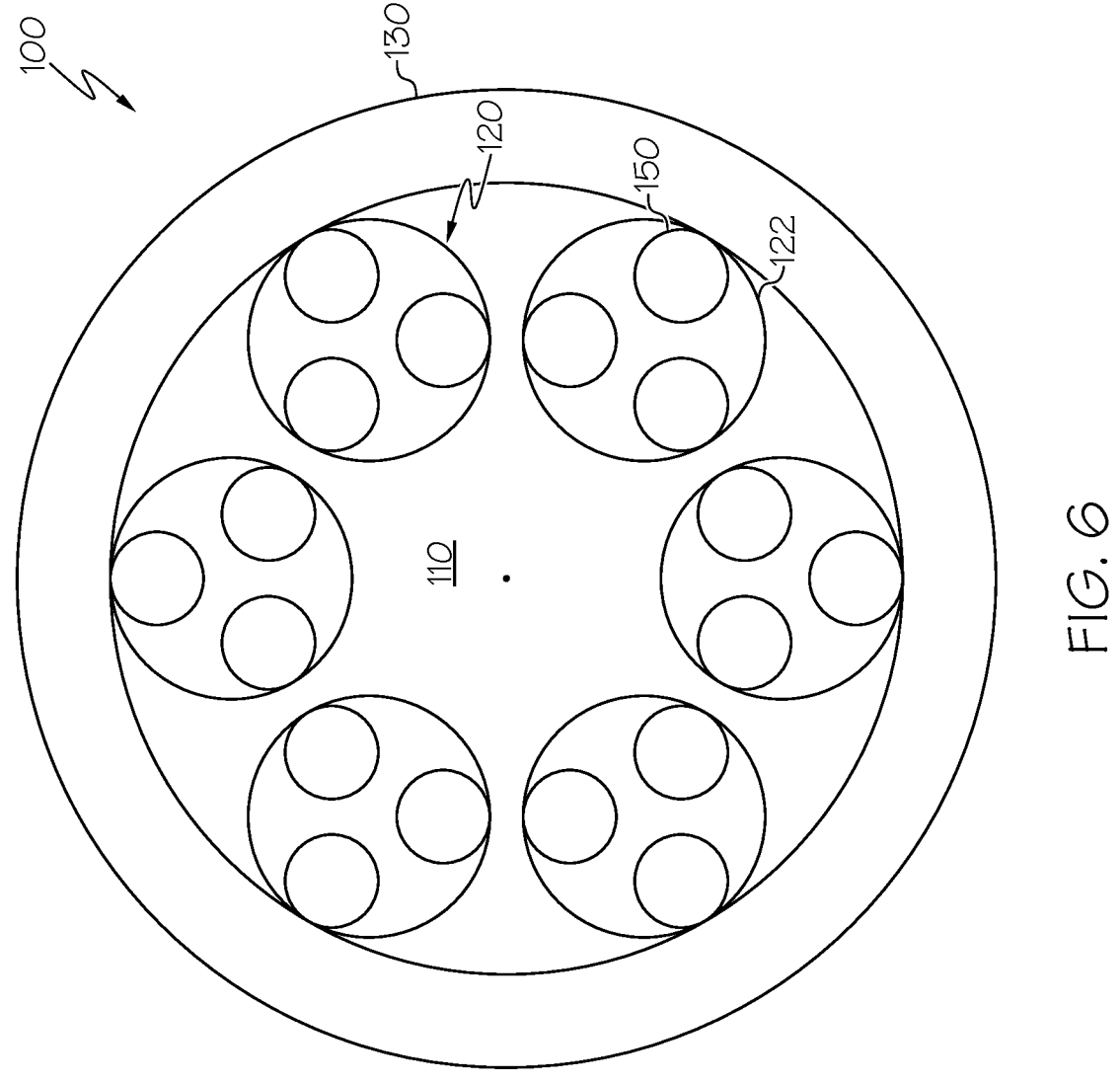
FIG. 6 schematically depicts a cross-sectional view of the hollow-core optical fiber according to the embodiment of Example 1.

A hollow-core optical fiber 100 was modeled to determine the confinement loss of the fiber. The hollow-core optical fiber 100 was modeled having a plurality of cladding elements 120 and a substrate 130. The plurality of cladding elements 120 included six primary capillaries 122 and three nested capillaries 150 positioned in each primary capillary 122. A cross-section of the modeled hollow-core optical fiber of Example 1 is depicted in FIG. 6. Each primary capillary 122 had a diameter of 25 µm and a wall thickness of 600 nm. Each nested capillary 150 had a diameter of 8.8 µm and a wall thickness of 600 nm. Each nested capillary 150 was spaced apart from each other nested capillary 150 positioned within a primary capillary 122. The spacing between nested capillaries was about 5 µm and in embodiments is from 0.5 µm to 10.0 µm, or from 1.0 µm to 9.0 µm, or from 1.5 µm to 8.0 µm, or from 2.0 µm to 7.0 µm, or from 2.5 µm to 6.0 µm. Specifically, the nested capillaries were 120 degrees apart, the distance between their centers was 14 µm, and they were spaced apart by 5.2 µm. The hollow core 110 had a diameter of about 30 µm. The substrate 130 had an inner diameter of about 80 µm and a wall thickness of about 200 µm. In embodiments, the inner diameter of substrate 130 is from 30 µm to 150 µm, or from 40 µm to 120 µm, or from 50 µm to 100 µm, or from 60 µm to 90 µm. In embodiments, the wall thickness of substrate 130 is from 10 µm to 500 µm, or from 20 µm to 450 µm, or from 50 µm to 400 µm, or from 75 µm to 350 µm, or from 100 µm to 300 µm, or from 125 µm to 250 µm. The substrate 130 and the plurality of cladding elements 120 comprised pure silica. As shown in FIG. 6, the structure of the hollow-core optical fiber is symmetric with a 60° rotational symmetry or six repetitions.

The confinement of an optical signal within the hollow core 110 of the hollow-core optical fiber 100 of Example 1 was modeled using COMSOL Multiphysics modeling software. According to the model, the hollow-core optical fiber 100 of Example 1 effectively confined the optical signal to the hollow core 110 of the fiber, and the confinement loss of the fiber was 0.018 dB/km at a wavelength of 1550 nm.

Example 2—Modeling Confinement Loss as a Function of Wavelength

Figure 7:
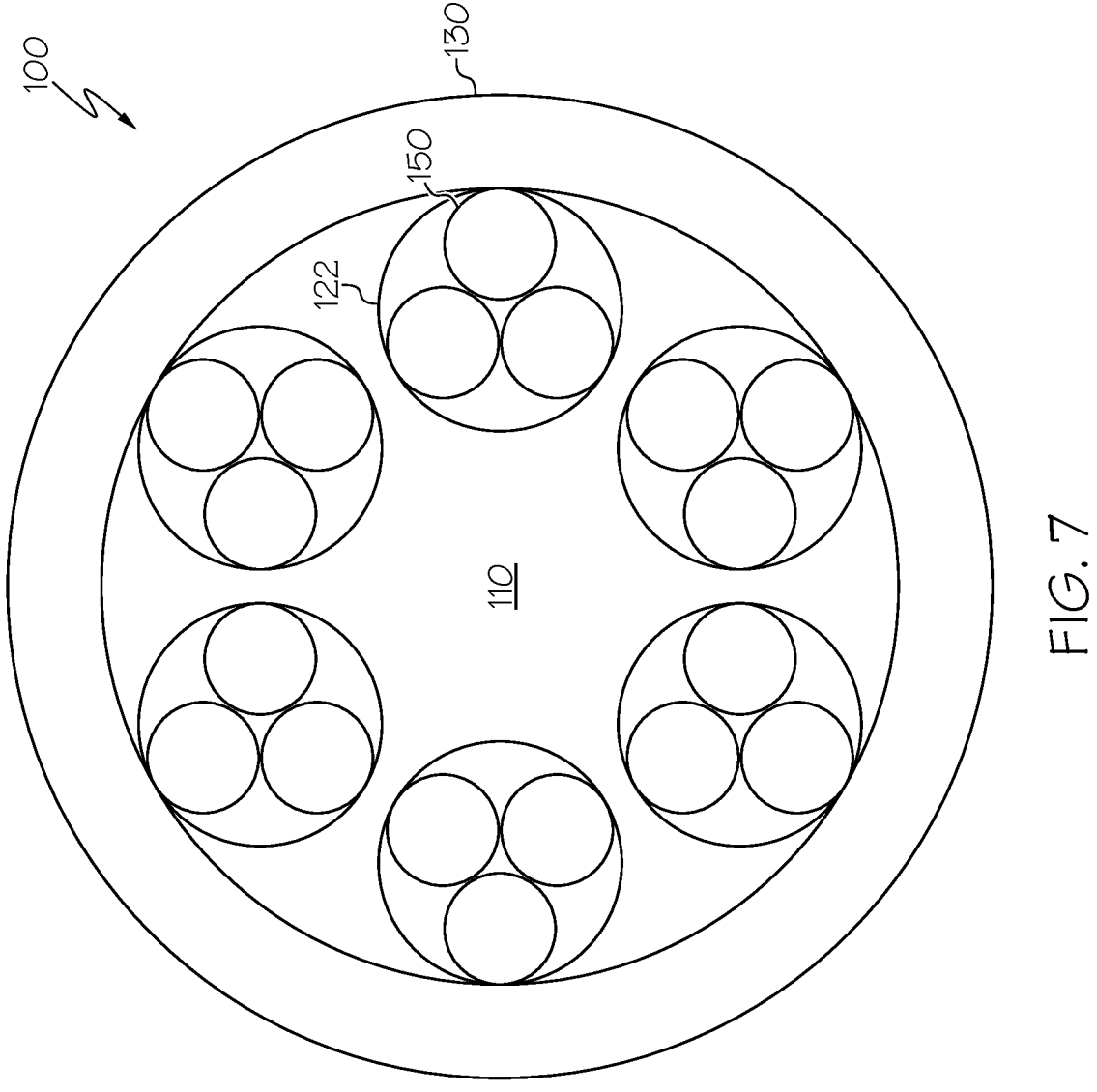
FIG. 7 schematically depicts a cross-sectional view of the hollow-core optical fiber according to the embodiment of Example 2.

The hollow-core optical fiber of Example 1 was modeled to determine the confinement loss of the fiber as a function of wavelength. Additionally, a hollow-core optical fiber of Example 2 was modeled to determine the confinement loss of the fiber as function of wavelength. The hollow-core optical fiber of Example 2 included a substrate 130 and a plurality of cladding elements 120. The plurality of cladding elements 120 included six primary capillaries 122 and three nested capillaries 150 positioned within each primary capillary 122. A cross-section of the modeled hollow-core optical fiber of Example 2 is depicted in FIG. 7. Each nested capillary 150 positioned within a primary capillary 122 directly contacted the other two nested capillaries 150 positioned within the primary capillary 122. Each primary capillary 122 had a diameter of 25 µm and a thickness of 600 µm. Each nested capillary 150 had a diameter of 11.6 µm and a thickness of 600 μm. The hollow core 110 had a diameter of about 30 μm. The substrate 130 and the plurality of cladding elements 120 comprises pure silica. The substrate 130 had an inner diameter of about 1am and a wall thickness of about 200 μm. The substrate 130 and the plurality of cladding elements 120 comprised pure silica. As shown in FIG. 7, the structure of the hollow-core optical fiber of Example 2 is symmetric with a 60 ° rotational symmetry or six repetitions.

Figure 8:
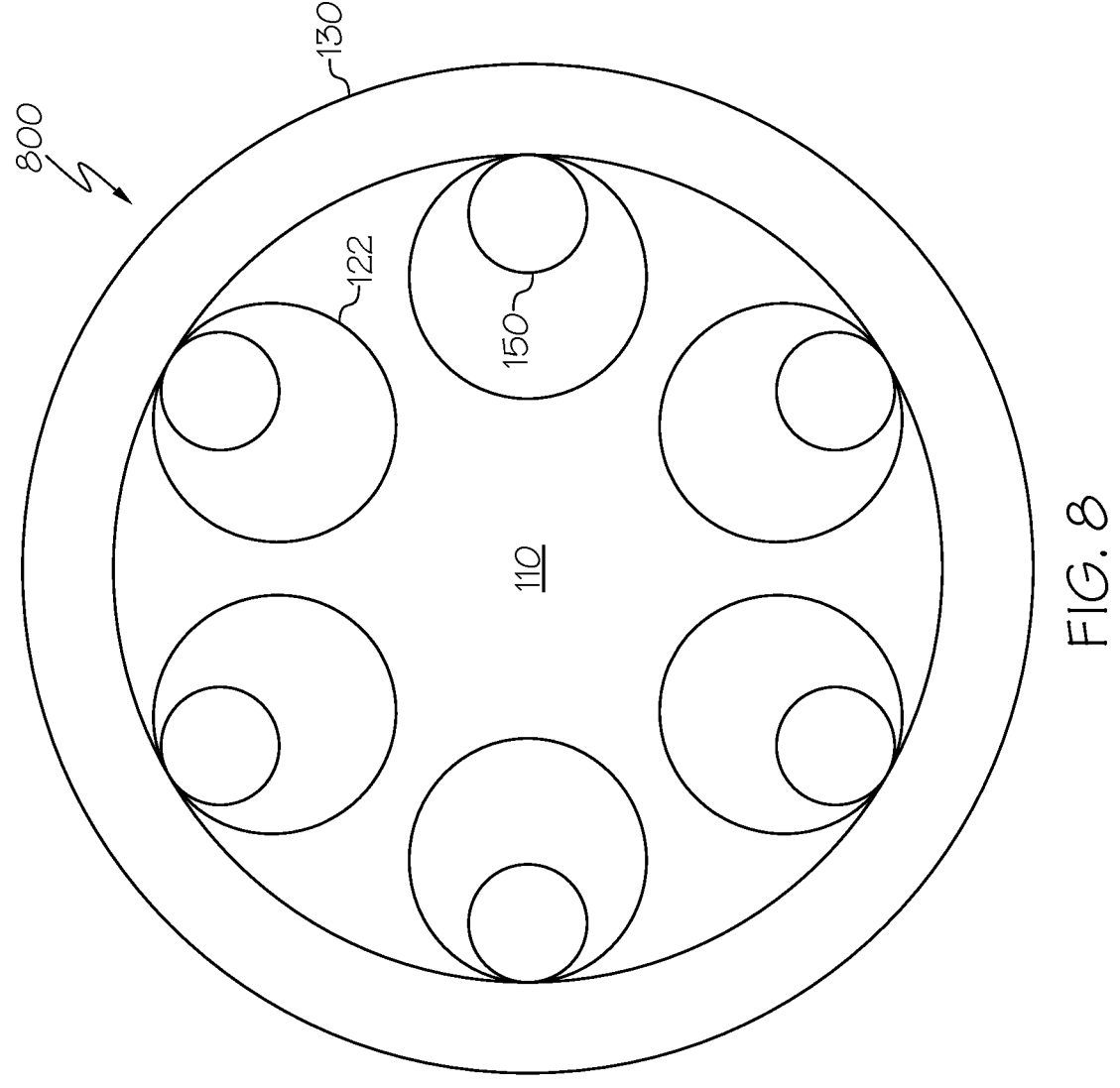
FIG. 8 schematically depicts a cross-sectional view of the hollow-core optical fiber of a comparative example.

Furthermore, a comparative hollow-core optical fiber was modeled. A cross-section of the modeled comparative hollow-core optical fiber 800 is depicted in FIG. 8. The comparative hollow-core optical fiber included a substrate 130, and a plurality of cladding elements 120. The plurality of cladding elements included six primary capillaries 122 with a single nested capillary 150 positioned in each primary capillary 122. The single nested capillary 150 was attached to the primary capillary 122 at a point proximate to the substrate 130. Each primary capillary 122 had a diameter of 27.5 μm and a thickness of 0.5 μm, and each nested capillary 150 had a diameter of 13 μm and a thickness of 0.53 μm. The hollow core 110 had a diameter of about 34.5 μm. The substrate 130 had an inner diameter of about 80 μm and a wall thickness of about 200 μm. The substrate 130 and the plurality of cladding elements 120 comprised pure silica. As shown in FIG. 8, the structure of the comparative hollow-core optical fiber is symmetric with a 60° rotational symmetry or six repetitions.

Figure 9:
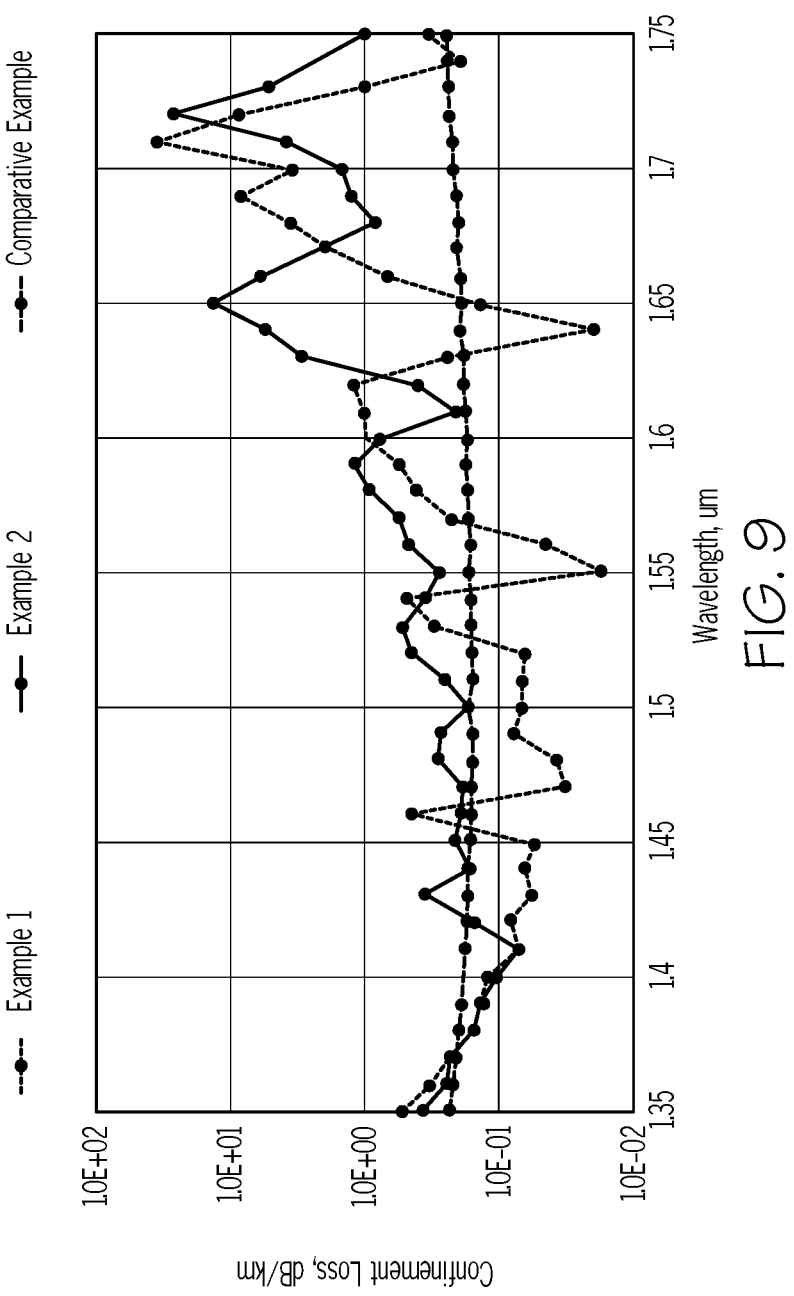
FIG. 9 graphically depicts the confinement loss of the hollow-core optical fibers of Examples 1 and 2 as a function of wavelength.

The confinement of an optical signal within the hollow core of each of the hollow-core optical fiber of Example 1, the hollow-core optical fiber of Example 2, and the comparative hollow-core optical fiber over wavelengths from 1.35 μm to 1.75 μm was modeled using COMSOL Multiphysics® modeling software. The results of the simulation are shown in FIG. 9. The hollow-core optical fibers of Example 1 and Example 2 offered comparable optical performance with the comparative hollow-core optical fiber with regards to confinement loss. However, preforms used to form the hollow-core optical fibers of Example 1 and Example 2 are expected to exhibit better mechanical stability during draw due to the presence of multiple nested capillaries. Advantages associated with improved mechanical stability include, but are not limited to, greater precision in controlling the diameters of primary capillaries 122, nested capillaries 150, and hollow core 110; and better stability in the position of primary capillaries 122 and nested capillaries 150 during fiber draw. These advantages lead to uniformity in the characteristics of hollow-core optical fibers formed from the preform over long lengths of fiber and more reproducible draws. The hollow-core optical fibers will also exhibit greater mechanical stiffness due to additional contact points; thus, their internal structure may deform less when subjected to a mechanical load, such as bending.

Example 3—Modeling Confinement Loss as a Function of Radius of Curvature

The confinement loss of the hollow-core optical fiber of Example 1 was modeled as a function of radius of curvature from 0.5 cm to 10 cm. Additionally, the confinement loss of the comparative hollow-core optical fiber shown in FIG. 8 was modeled as a function of the radius of curvature. As the hollow-core optical fiber of Example 1 has two axes of symmetry, two different bending directions were modeled; however, there was no significant difference between the results obtained from modeling the different bending directions. The results of the modeling are displayed in FIG. 10.

Figure 10:
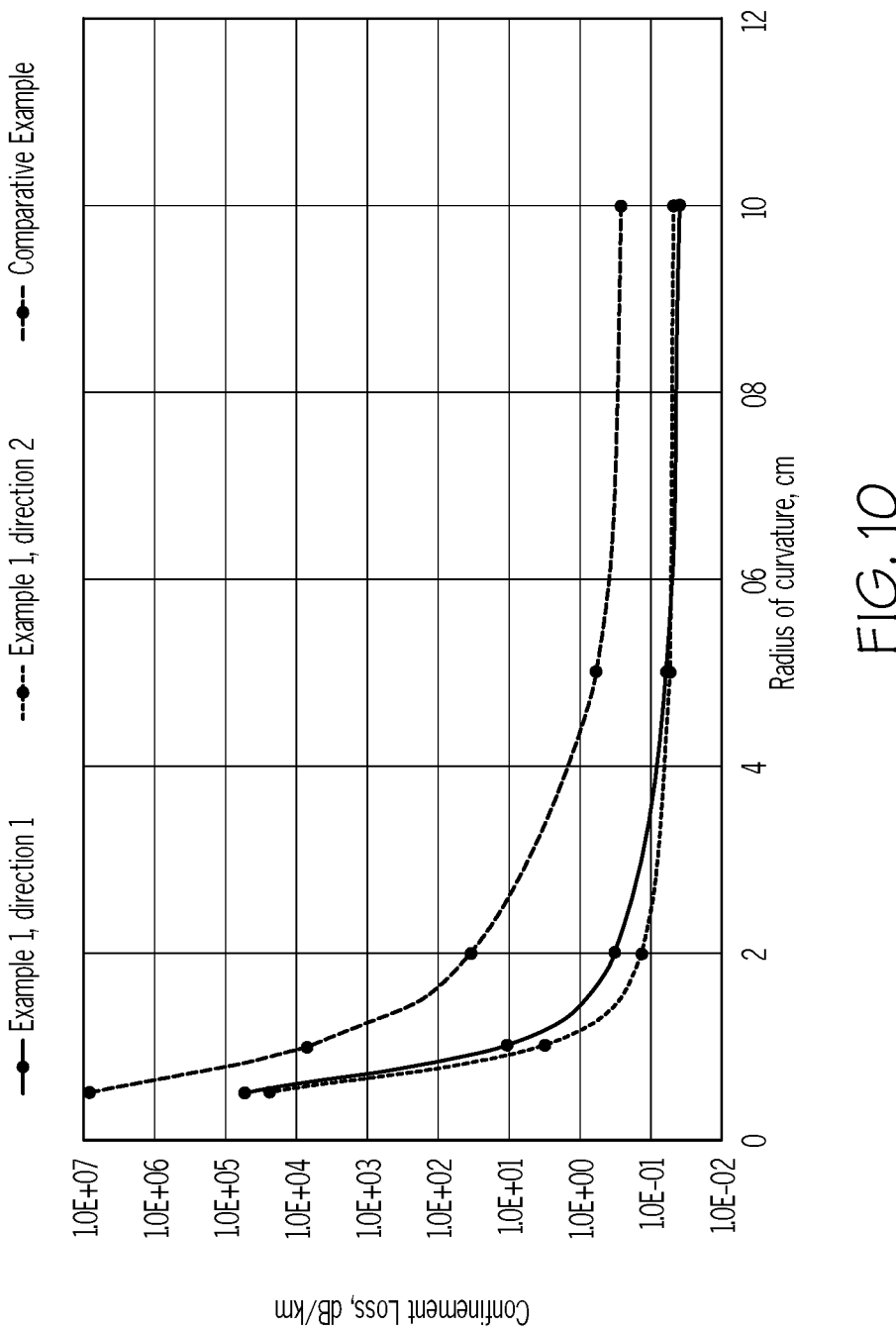
FIG. 10 graphically depicts the confinement loss of a hollow-core optical fiber of Example 1 as a function of radius of curvature.

As shown in FIG. 10, the hollow-core optical fiber of Example 1 exhibited lower confinement loss than the comparative fiber over the range of curvatures. Accordingly, the fiber of Example 1 is expected to be less sensitive to bending than the comparative fiber.

Figure 11:
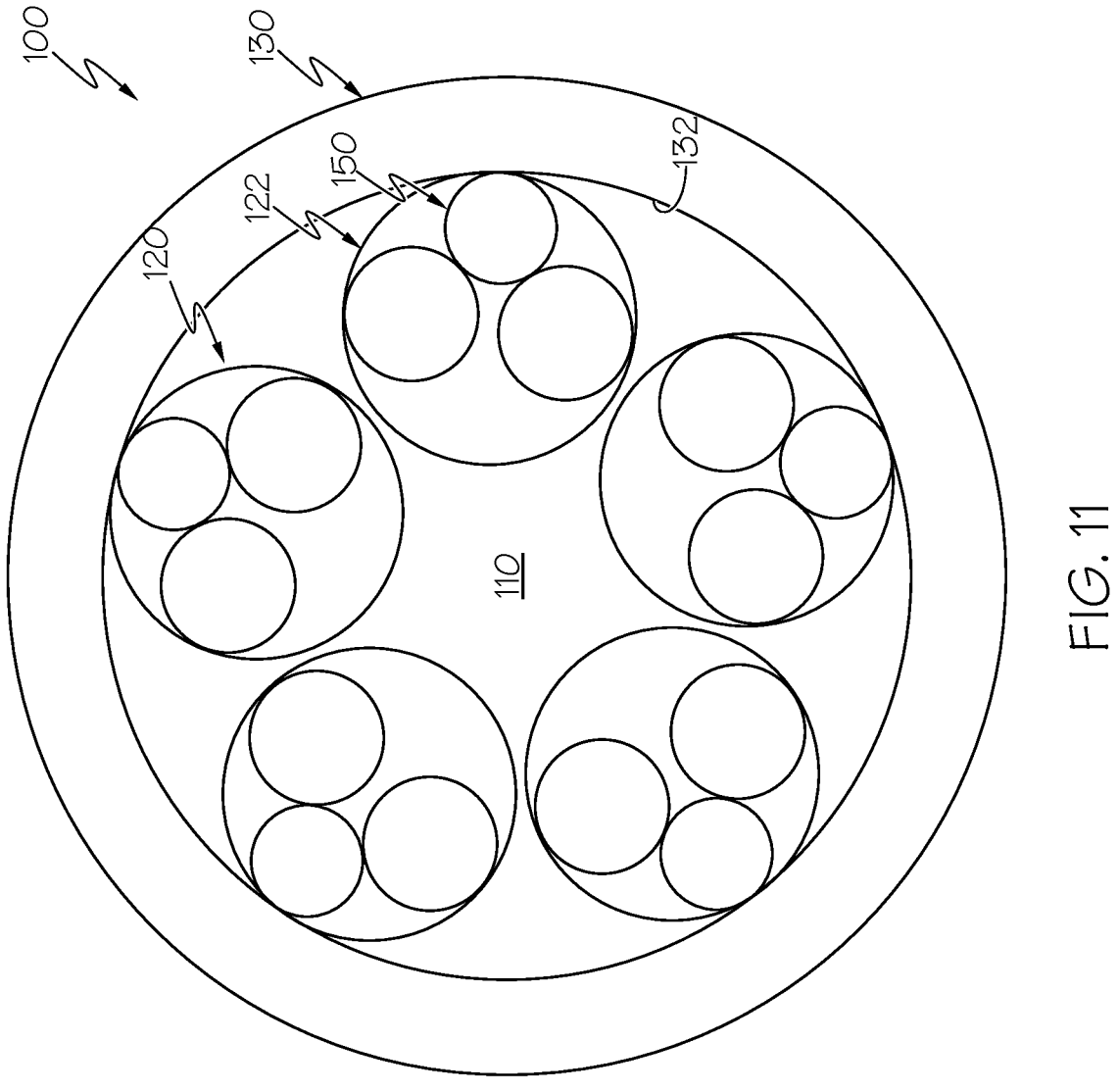
FIG. 11 schematically depicts a cross-sectional view of the hollow-core optical fiber according to the embodiment of Example 4.

Example 4—Modeling Confinement Loss of a Hollow-Core Optical Fiber Comprising Five Primary Capillaries A hollow-core optical fiber 100 was modeled to determine the confinement loss of the fiber. The hollow-core optical fiber 100 had a plurality of cladding elements 120 and a substrate 130. The plurality of cladding elements included five primary capillaries 122 and three nested capillaries 150 positioned in each primary capillary 122. A cross-section of the modeled hollow-core optical fiber of Example 4 is depicted in FIG. 11. Each primary capillary 122 had a diameter of 40 μm and a thickness of 600 nm. The nested capillary 150 proximate to the inner surface 132 of the substrate 130 in each primary capillary 122 had a diameter of 14.5 μm and a thickness of 600 nm. The other two nested capillaries 150 each had a diameter of 18 μm and a thickness of 600 nm. The nested capillary 150 proximate to the inner surface 132 of the substrate 130 directly contacted each other nested capillary 150 positioned within a primary capillary 122. The hollow core 110 had a diameter of about 34.5 μm. The substrate 130 had an inner diameter of about 80 μm and a wall thickness of about 200 μm. The substrate 130 and the plurality of cladding elements 120 comprised pure silica. As shown in FIG. 11, the structure of the hollow-core optical fiber is symmetric with a 72° rotational symmetry or five repetitions.

Figure 12:
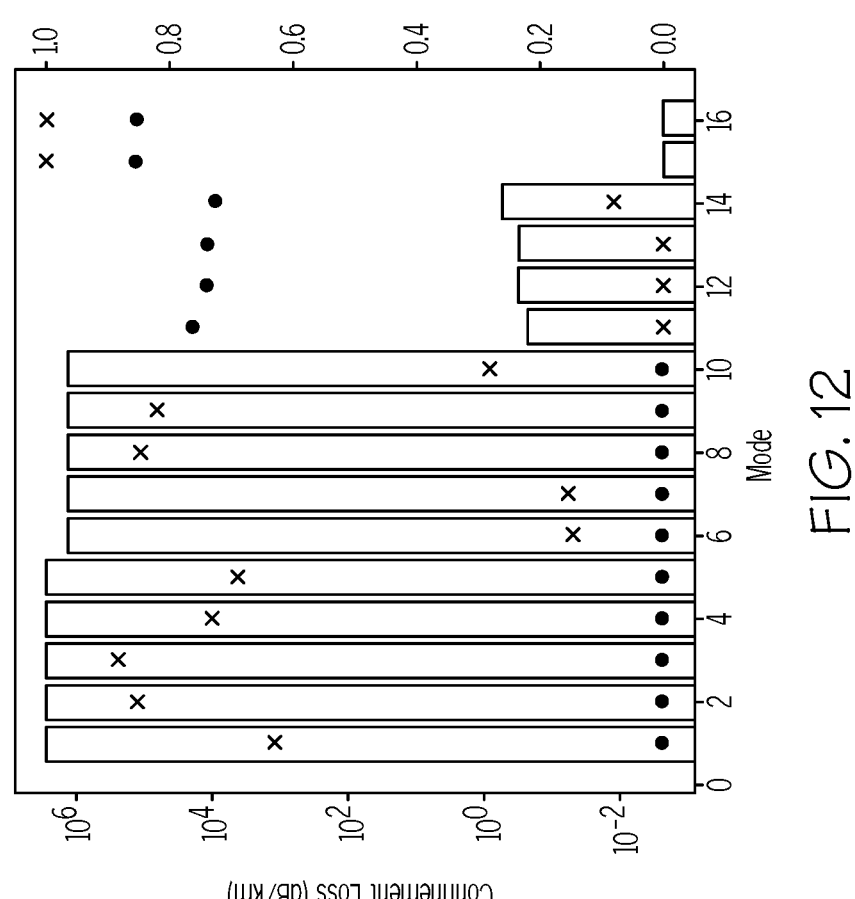
FIG. 12 graphically depicts the confinement loss of higher order modes of an optical signal in the hollow-core optical fiber of Example 4.

The confinement of an optical signal within the hollow core 110 of the hollow-core optical fiber of Example 4 was modeled using COMSOL Multiphysics® modeling software. According to the model, the hollow-core optical fiber of Example 4 effectively confined the optical signal to the hollow-core of the fiber. FIG. 12 provides information on the modeled confinement loss for multiple modes of the optical signal. FIG. 12 also depicts axillary metrics of the electric field for multiple modes of the optical signal. E_core is ratio of energy transmitted in the air core to the total energy transmitted in a fiber. E_center is ratio of a magnitude of electric field in the geometric center of a fiber to maximum magnitude of electric field in fiber cross-section. These metrics help to identify a fundamental mode, which should have both E_core and E_center close to unity. In FIG. 12, the fundamental modes are modes 15 and 16. As shown in FIG. 12, the confinement loss of secondary modes (modes 11-14, corresponding to modes HE21a, HE21b, TE01, and TM01) is about two orders of magnitude greater than the confinement loss of the fundamental modes (modes 15 and 16, corresponding to modes HE11a and HE11b). The confinement loss of higher order modes (modes 1-10) was much higher than the confinement loss of the fundamental modes and secondary modes.

Figure 13:
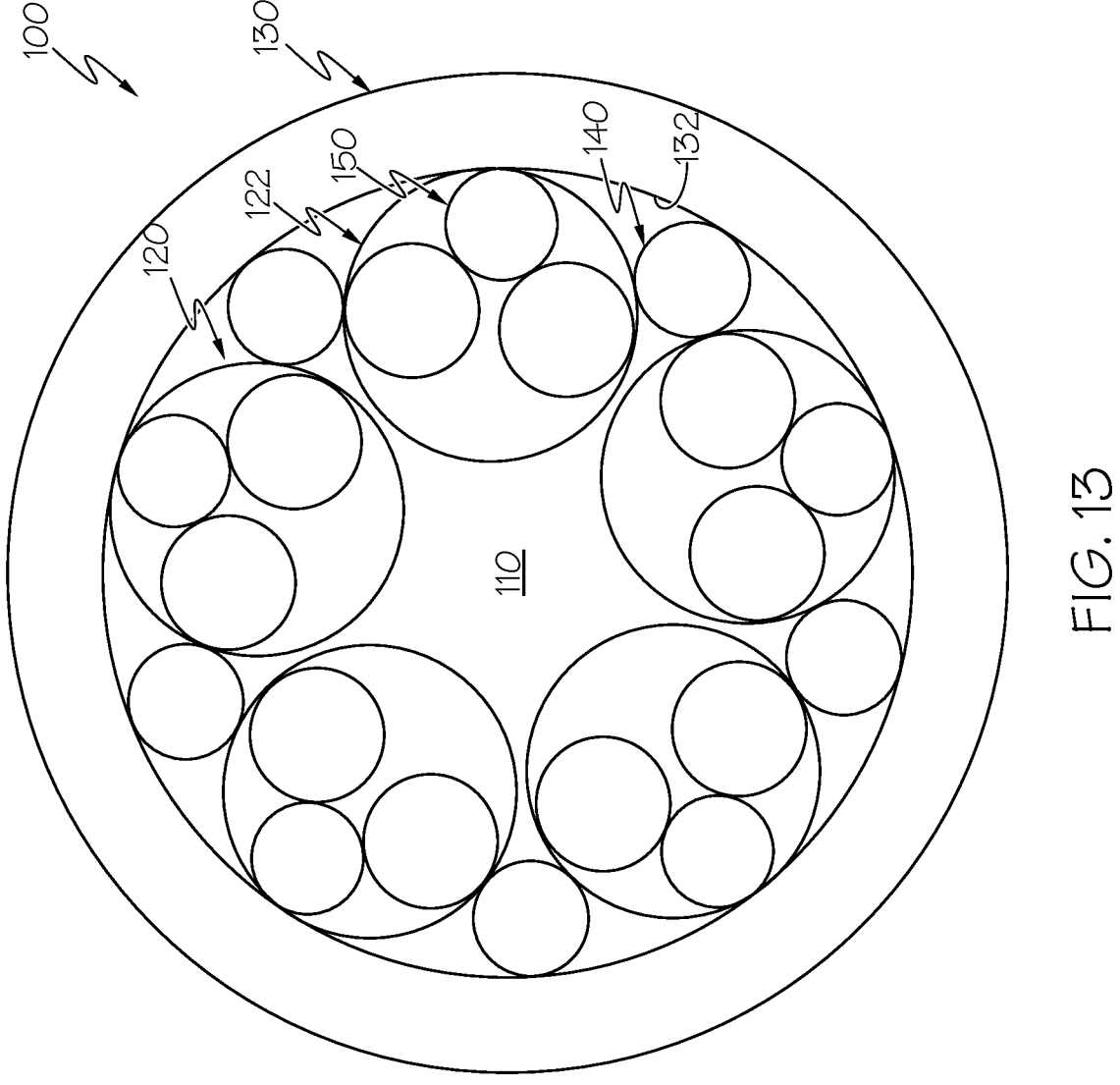
FIG. 13 schematically depicts a cross-sectional view of the hollow-core optical fiber according to the embodiment of Example 5.

Example 5—Modeling Confinement Loss of a Hollow-Core Optical Fiber Comprising Support Capillaries A hollow-core optical fiber 100 was modeled to determine the confinement loss of the fiber. The hollow-core optical fiber 100 had a plurality of cladding elements 120 and a substrate 130. The plurality of cladding elements included five primary capillaries 122, three nested capillaries 150 positioned in each primary capillary 122, and five support capillaries 410. A cross-section of the modeled hollow-core optical fiber 100 of Example 5 is depicted in FIG. 13. Each primary capillary 122 had a diameter of 40 μm and a thickness of 600 nm. The nested capillary 150 proximate to the inner surface 132 of the substrate 130 in each primary capillary 122 had a diameter of 14.5 μm and a thickness of 600 nm. The other two nested capillaries 150 each had a diameter of 18 μm and a thickness of 600 nm. The nested capillary 150 proximate to the inner surface 132 of the substrate 130 directly contacted each of the other two nested capillaries 150 positioned within a primary capillary 122. Each support capillary 410 had a diameter of about 16 μm and a thickness of 600 nm. The hollow core 110 had a diameter of about 34.5 μm. The substrate 130 had an inner diameter of about 80 μm and a wall thickness of about 200 μm. The substrate 130 and the plurality of cladding elements 120 comprised pure silica. As shown in FIG. 13, the structure of the hollow-core optical fiber 100 is symmetric with a 72° rotational symmetry or five repetitions. Due to the inclusion of the support capillaries 410, the hollow-core optical fiber 100 of Example 5 is expected to exhibit improved mechanical integrity.

Figure 14:
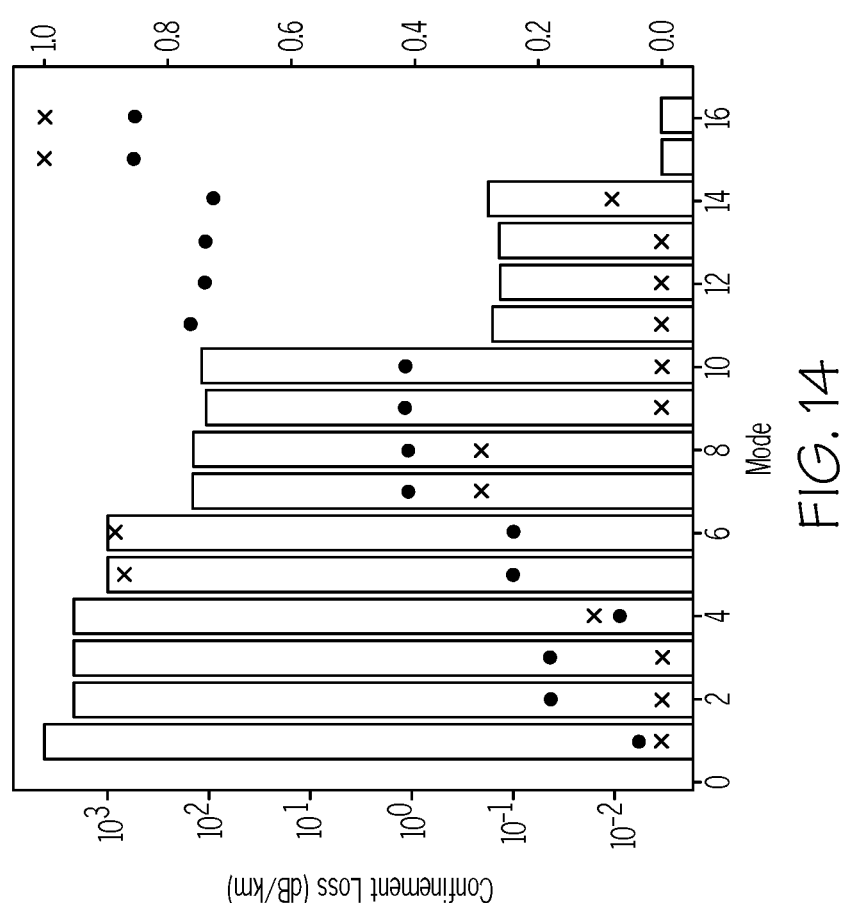
FIG. 14 graphically depicts the confinement loss of higher order modes of an optical signal in the hollow-core optical fiber of Example 5.

The confinement of an optical signal within the hollow core 110 of the hollow-core optical fiber 100 of Example 5 was modeled using COMSOL Multiphysics® modeling software. According to the model, the hollow-core optical fiber 100 of Example 4 effectively confined the optical signal to the hollow core 110 of the fiber despite the extra contact points between capillaries. FIG. 14 provides information on the modeled confinement loss for multiple modes of the optical signal. FIG. 12 also depicts axillary metrics of electric field for multiple modes of the optical signal. E_core is ratio of energy transmitted in the air core to the total energy transmitted in a fiber. E_center is ratio of a magnitude of electric field in the geometric center of a fiber to maximum magnitude of electric field in fiber cross-section. These metrics help to identify a fundamental mode, which should have both E_core and E_center close to unity. In FIG. 14, the fundamental modes are modes 15 and 16. As shown in FIG. 14, the fiber exhibits good extinction of secondary modes (modes 11-14, corresponding to modes HE21a, HE21b, TE01, and TM01) compared to fundamental modes (modes 15-16, corresponding to modes HE11a and HE11b). Additionally, the confinement loss of higher order modes (modes 1-10) was much higher than the confinement loss of the fundamental modes and secondary modes. This may allow the hollow-core fiber to effectively operate as a single-mode fiber.

The present disclosure is directed to various embodiments of hollow-core optical fibers. In embodiments, hollow-core optical fiber comprises a hollow core extending along a central longitudinal axis of the fiber; a substrate; and a plurality of cladding elements spaced apart from each other and positioned between the hollow core and the substrate. The cladding elements comprise a primary capillary and a plurality of nested capillaries positioned within each primary capillary. The hollow-core optical fibers may be operable to transmit optical signals, and the cladding elements may reduce attenuation of the optical signals through one or more of an anti-resonant effect and an inhibited coupling mechanism.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A hollow-core optical fiber comprising:
   a hollow core extending along a central longitudinal axis of the hollow-core optical fiber;
   a substrate, the substrate comprising a tubular shape and an inner surface surrounding the central longitudinal axis of the hollow-core optical fiber; and
   a plurality of cladding elements positioned between the hollow core and the substrate, each of the plurality of cladding elements extending in a direction parallel to the central longitudinal axis of the hollow-core optical fiber, each of the plurality of cladding elements comprising:
   a primary capillary, the primary capillary directly contacting the inner surface of the substrate and comprising an inner surface defining a cavity, and
   a plurality of nested capillaries positioned within the cavity, each of the plurality of nested capillaries directly contacting the inner surface of the primary capillary;
   wherein each nested capillary directly contacts at least one other nested capillary.

2. The hollow-core optical fiber of claim 1, wherein the plurality of cladding elements comprises from 3 to 8 primary capillaries.

3. The hollow-core optical fiber of claim 1, wherein from 2 to 5 nested capillaries are positioned within the cavity of each primary capillary.

4. The hollow-core optical fiber of claim 1, wherein three nested capillaries are positioned within the cavity of each primary capillary.

5. The hollow-core optical fiber of claim 4, wherein each nested capillary is arranged such that each nested capillary directly contacts the inner surface of the primary capillary on a vertex of an isosceles triangle, wherein each vertex of the isosceles triangle is on the inner surface of the primary capillary in a cross section of the primary capillary perpendicular to the central longitudinal axis of the hollow-core optical fiber.

6. The hollow-core optical fiber of claim 4, wherein each nested capillary is arranged such that each nested capillary directly contacts the inner surface of the primary capillary on a vertex of an equilateral triangle wherein each vertex of the equilateral triangle is on the inner surface of the primary capillary on a cross section of the primary capillary perpendicular to the central longitudinal axis of the hollow-core optical fiber.

7. The hollow-core optical fiber of claim 4, wherein one nested capillary in each primary capillary is directly connected to the inner surface of the primary capillary proximate to the substrate.

8. The hollow-core optical fiber of claim 1, wherein each primary capillary is spaced apart from adjacent primary capillaries in a circumferential direction.

9. The hollow-core optical fiber of claim 1, wherein each primary capillary has an inner diameter from 12 μm to 50 μm.

10. The hollow-core optical fiber of claim 1, wherein each primary capillary has a wall thickness from 0.1 μm to 4.0 μm.

11. The hollow-core optical fiber of claim 1, wherein each nested capillary has a diameter from 2 μm to 16 μm.

12. The hollow-core optical fiber of claim 1, wherein each nested capillary has a wall thickness 0.1 μm to 4.0 μm.

13. The hollow-core optical fiber of claim 1, wherein at least one of the plurality of cladding elements comprises one or more support capillaries wherein each support capillary directly contacts the inner surface of the substrate and directly contacts at least one primary capillary.

14. The hollow-core optical fiber of claim 13, wherein each of the one or more support capillaries directly contacts the inner surface of the substrate and directly contacts two primary capillaries.

15. The hollow-core optical fiber of claim 13, wherein each of the one or more support capillaries comprises a support capillary central longitudinal axis parallel to the central longitudinal axis of the hollow-core optical fiber, and the support capillary central longitudinal axis of each support capillary is a first radial distance from the central longitudinal axis of the hollow-core optical fiber.

16. The hollow-core optical fiber of claim 15, wherein:

each primary capillary comprises a primary capillary central longitudinal axis parallel to the central longitudinal axis of the hollow-core optical fiber;

the primary capillary central longitudinal axis of each primary capillary is spaced apart from the central longitudinal axis of the hollow-core optical fiber by a second radial distance; and the first radial distance is greater than the second radial distance.

17. The hollow-core optical fiber of claim 1, wherein the plurality of cladding elements are configured to provide an anti-resonant effect at a wavelength from 350 nm to 8000 nm, the anti-resonant effect operable to confine an optical signal propagating in the hollow-core optical fiber at the wavelength from 350 nm to 8000 nm to the hollow core.

18. The hollow-core optical fiber of claim 1, wherein the hollow-core optical fiber has a minimum confinement loss of a fundamental mode of an optical signal propagating in the hollow core of less than or equal to 0.4 dB/km within a wavelength range from 350 nm to 8000 nm.

19. The hollow-core optical fiber of claim 1, wherein the hollow-core optical fiber has a minimum bending loss of a fundamental mode of an optical signal propagating in the hollow core of less than or equal to 0.1 dB/km within a wavelength range from 350 nm to 8000 nm for a bend radius of 6 cm.

\* \* \* \* \*